(12) United States Patent
Lu et al.

(10) Patent No.: US 7,840,109 B2
(45) Date of Patent: Nov. 23, 2010

(54) FACTORY SPLICED CABLE ASSEMBLY

(75) Inventors: Yu Lu, Eden Prairie, MN (US); Erik Gronvall, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 156 days.

(21) Appl. No.: 12/180,670

(22) Filed: Jul. 28, 2008

(65) Prior Publication Data

US 2009/0022460 A1 Jan. 22, 2009

Related U.S. Application Data

(63) Continuation-in-part of application No. 11/837,862, filed on Aug. 13, 2007, now Pat. No. 7,454,106.

(60) Provisional application No. 60/976,054, filed on Sep. 28, 2007, provisional application No. 60/950,521, filed on Jul. 18, 2007, provisional application No. 60/837,481, filed on Aug. 14, 2006.

(51) Int. Cl.
*G02B 6/44* (2006.01)
(52) U.S. Cl. ...................... 385/114; 385/100
(58) Field of Classification Search .......... 385/100–114
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |

(Continued)

FOREIGN PATENT DOCUMENTS

DE 31 08 381 A1 9/1982

(Continued)

OTHER PUBLICATIONS

"Cable Assemblies: Molding & Termination," http://www.dgo.com/prodcable.htm, 8 pages (Copyright 2001).

(Continued)

*Primary Examiner*—Rhonda S Peace
(74) *Attorney, Agent, or Firm*—Merchant & Gould P.C.

(57) ABSTRACT

A telecommunications cable including a main cable having a central buffer tube enclosed within a cable jacket and a ribbon stack positioned within the buffer tube. The main cable includes a cut region where a slot has been cut through the cable jacket and the buffer tube to provide access to the ribbon stack during manufacture of the telecommunication cable. A tether branches from the main cable at the cut region. The tether includes an optical fiber that is optically coupled to an optical fiber of the ribbon stack.

11 Claims, 38 Drawing Sheets

U.S. PATENT DOCUMENTS

| | | |
|---|---|---|
| 4,475,935 A | 10/1984 | Tanaka et al. |
| 4,481,380 A | 11/1984 | Wood et al. |
| 4,490,315 A | 12/1984 | Charlebois et al. |
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,759,602 A | 7/1988 | Pascher |
| 4,761,052 A | 8/1988 | Buekers et al. |
| 4,764,232 A | 8/1988 | Hunter |
| 4,818,824 A | 4/1989 | Dixit et al. |
| 4,822,134 A | 4/1989 | Campbell |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 4,983,013 A | 1/1991 | Dotzer et al. |
| 4,983,333 A | 1/1991 | Blew |
| 4,985,185 A | 1/1991 | Mayr et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A | 6/1992 | Edmundson |
| 5,163,116 A | 11/1992 | Oestreich et al. |
| 5,185,844 A | 2/1993 | Bensel, III et al. |
| 5,194,692 A | 3/1993 | Gallusser et al. |
| 5,210,812 A | 5/1993 | Nilsson et al. |
| 5,217,808 A | 6/1993 | Cobb |
| 5,241,611 A | 8/1993 | Gould |
| 5,245,151 A | 9/1993 | Chamberlain et al. |
| 5,283,014 A | 2/1994 | Oestreich et al. |
| 5,335,408 A | 8/1994 | Cobb |
| 5,347,089 A | 9/1994 | Barrat et al. |
| 5,353,367 A | 10/1994 | Czosnowski et al. |
| 5,371,824 A | 12/1994 | Parris et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A | 8/1995 | Ray et al. |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,608,832 A | 3/1997 | Pfandl et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,731,051 A | 3/1998 | Fahey et al. |
| 5,734,776 A | 3/1998 | Puetz |
| 5,761,361 A | 6/1998 | Pfandl et al. |
| 5,767,448 A | 6/1998 | Dong |
| 5,778,122 A | 7/1998 | Giebel et al. |
| 5,815,908 A | 10/1998 | Wichmann |
| 5,823,646 A | 10/1998 | Arizpe et al. |
| 5,825,963 A | 10/1998 | Burgett |
| 5,861,575 A | 1/1999 | Broussard |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,311,000 B1 | 10/2001 | Schneider |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 | 2/2006 | Elkins, II et al. |
| 7,016,592 B2 | 3/2006 | Elkins, II et al. |
| 7,088,893 B2 | 8/2006 | Cooke et al. |
| 7,127,143 B2 | 10/2006 | Elkins, II et al. |
| 7,184,633 B2 | 2/2007 | Cooke et al. |
| 7,251,411 B1 | 7/2007 | Lu et al. |
| 7,317,863 B2 | 1/2008 | Lu et al. |
| 7,454,106 B2 | 11/2008 | Cobb, III et al. |
| 2002/0064364 A1 | 5/2002 | Battey et al. |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0002621 A1 | 1/2005 | Zimmel et al. |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0129375 A1 | 6/2005 | Elkins, II et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |

| | | | |
|---|---|---|---|
| 2005/0259930 A1 | 11/2005 | Elkins, II et al. | |
| 2005/0276552 A1 | 12/2005 | Cooke et al. | |
| 2006/0056782 A1 | 3/2006 | Elkins, II et al. | |
| 2006/0115220 A1 | 6/2006 | Elkins, II et al. | |
| 2006/0193573 A1 | 8/2006 | Greenwood et al. | |
| 2007/0212004 A1 | 9/2007 | Lu et al. | |

FOREIGN PATENT DOCUMENTS

| | | |
|---|---|---|
| DE | 35 37 684 A1 | 4/1987 |
| DE | 39 01 610 C1 | 2/1990 |
| DE | 42 14 377 A1 | 11/1993 |
| DE | 43 41 999 A1 | 6/1995 |
| EP | 0 115 725 A1 | 8/1984 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 8-43639 | 2/1996 |
| JP | 2001-116968 | 4/2001 |
| WO | WO 2005/119322 A1 | 12/2005 |
| WO | WO 2006/044080 A1 | 4/2006 |
| WO | WO 2007/103436 A2 | 9/2007 |
| WO | WO 2008/021253 A2 | 2/2008 |

OTHER PUBLICATIONS

"DAM/BLOK™ Electrical Splice Kit," http://www.pmiind.com/products/damblok.html, 3 pages (Copyright 2000).

"Factory Installed Termination Systems for Fiber Optic Cable Splices," 1 page (admitted as prior art as of Jul. 21, 2006).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

International Search Report and Written Opinion mailed Jan. 25, 2008.

International Search Report and Written Opinion mailed Feb. 2, 2010.

Invitation to Pay Additional Fees with Partial International Search mailed Sep. 24, 2009.

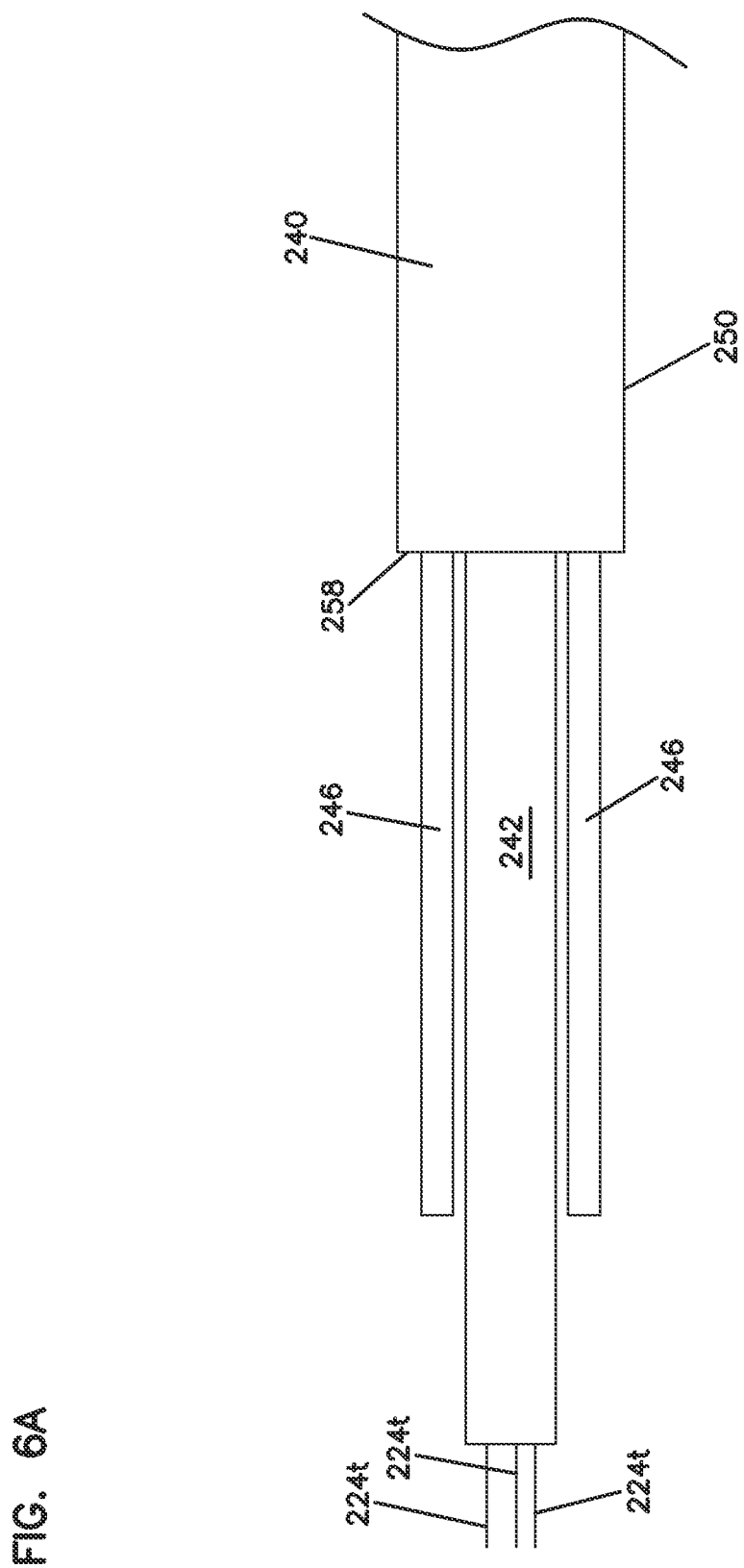

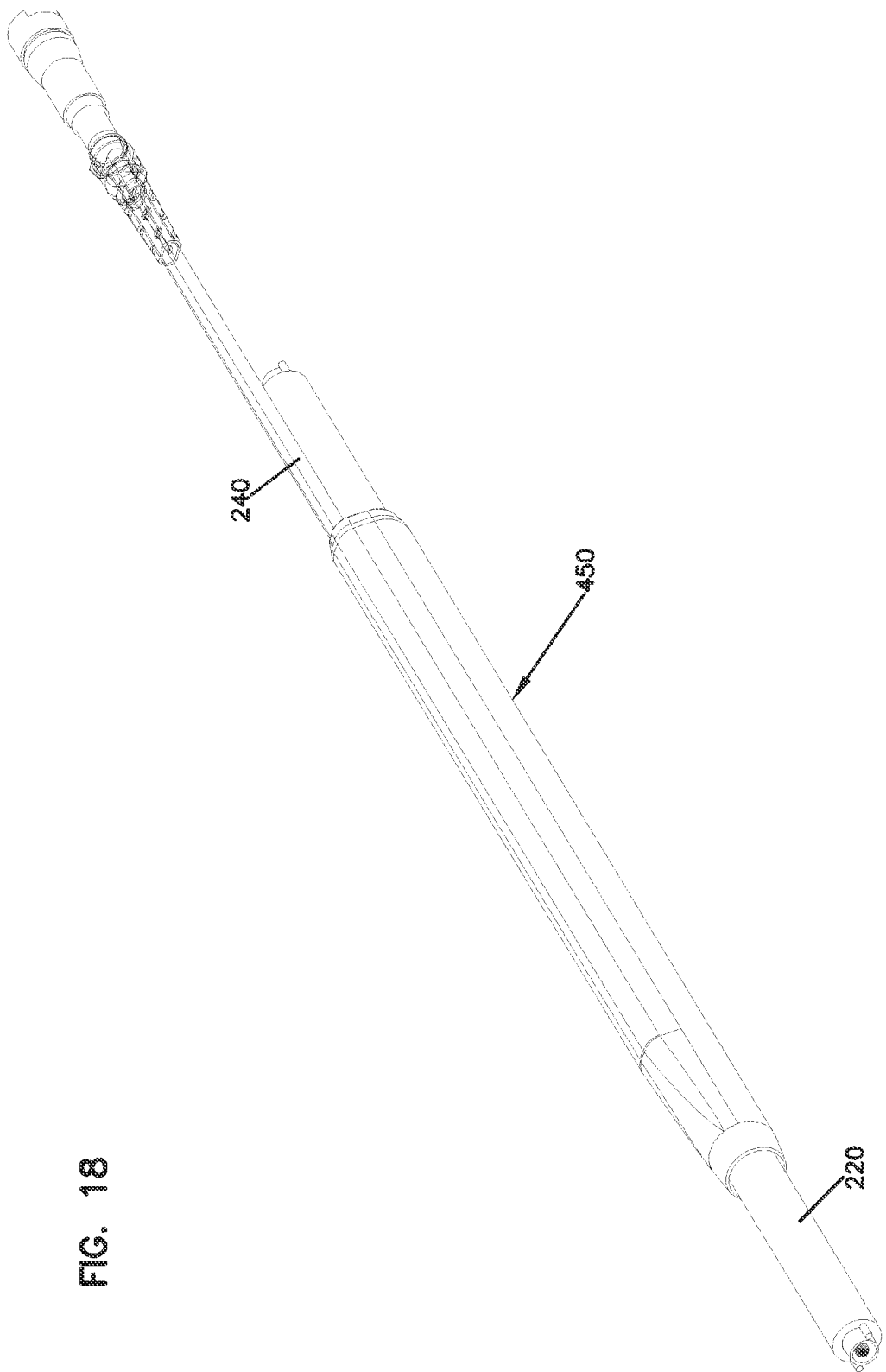

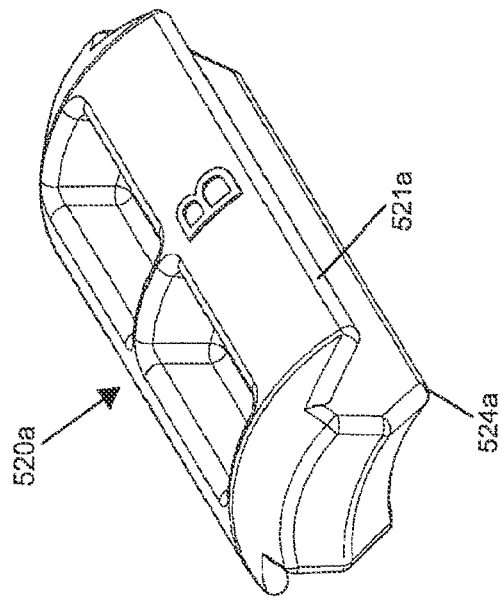
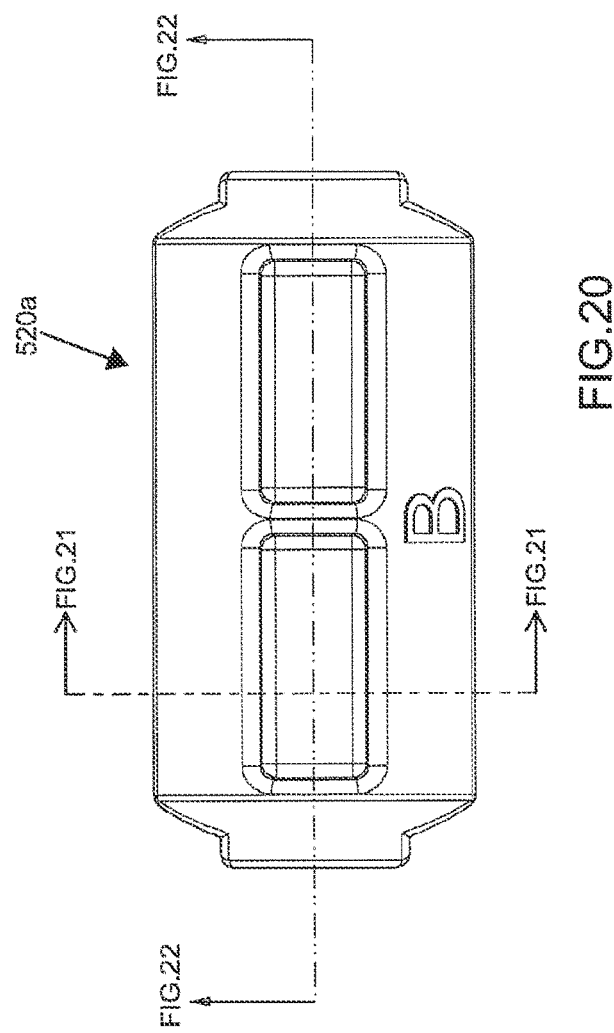

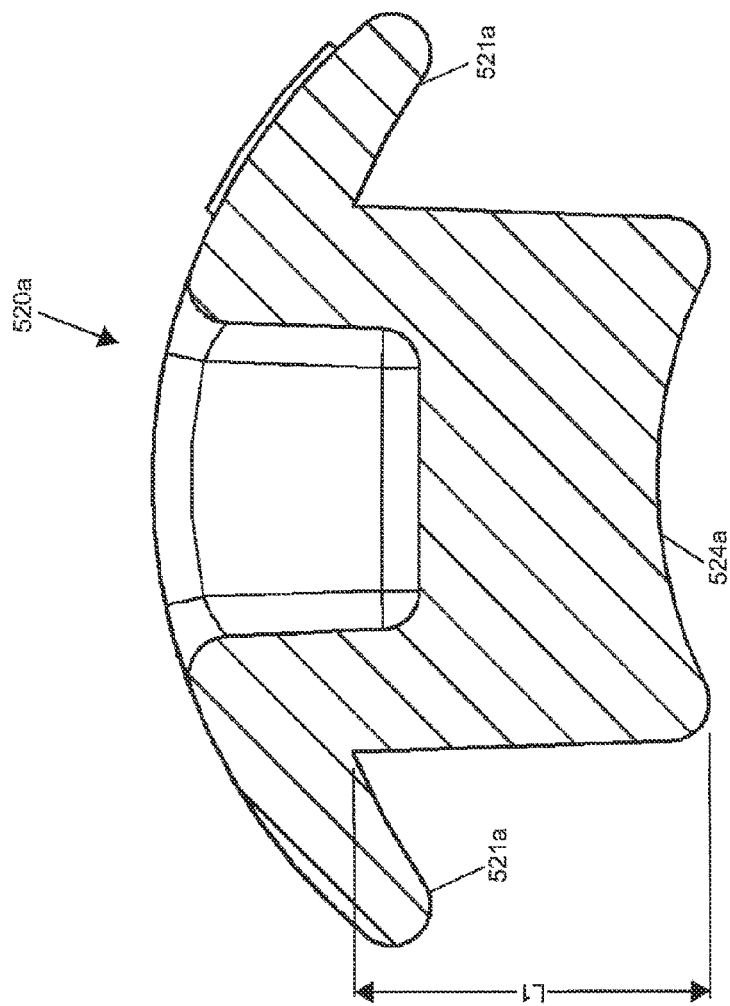

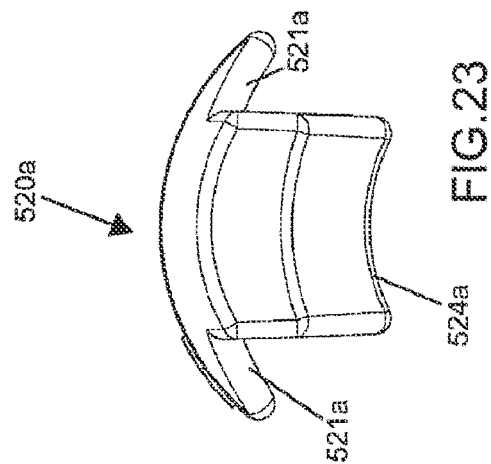
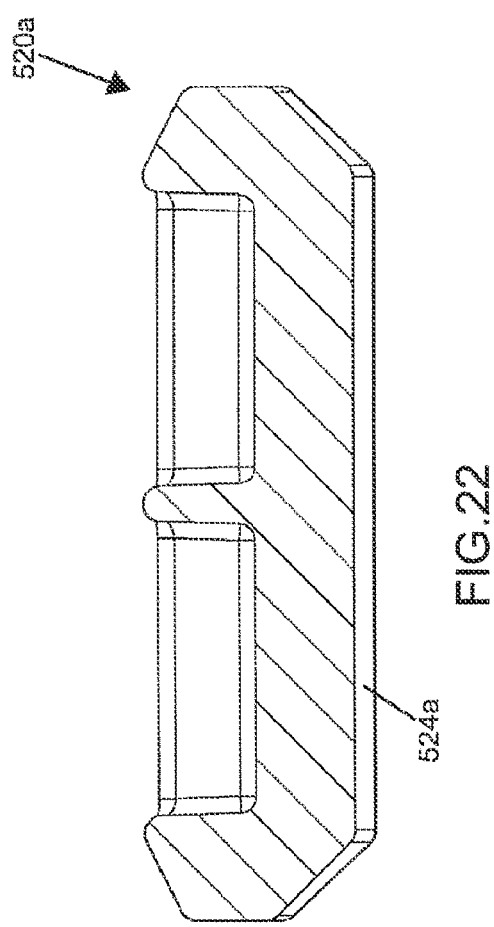

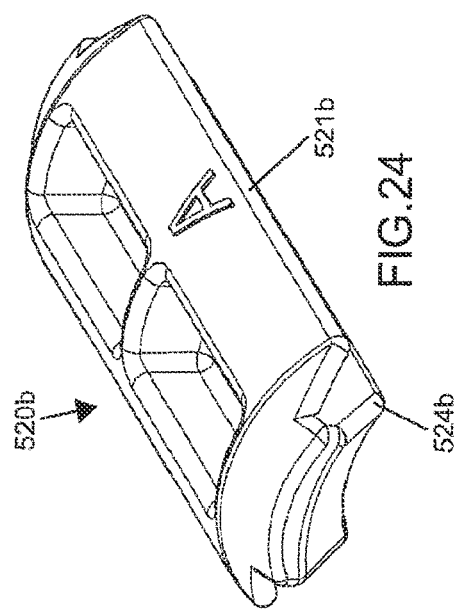
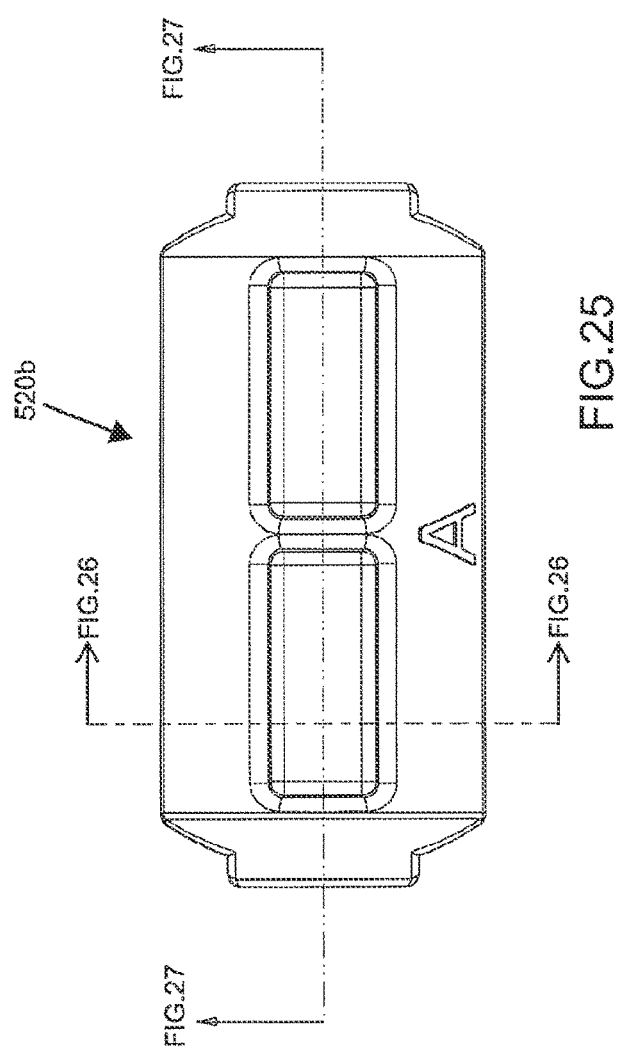

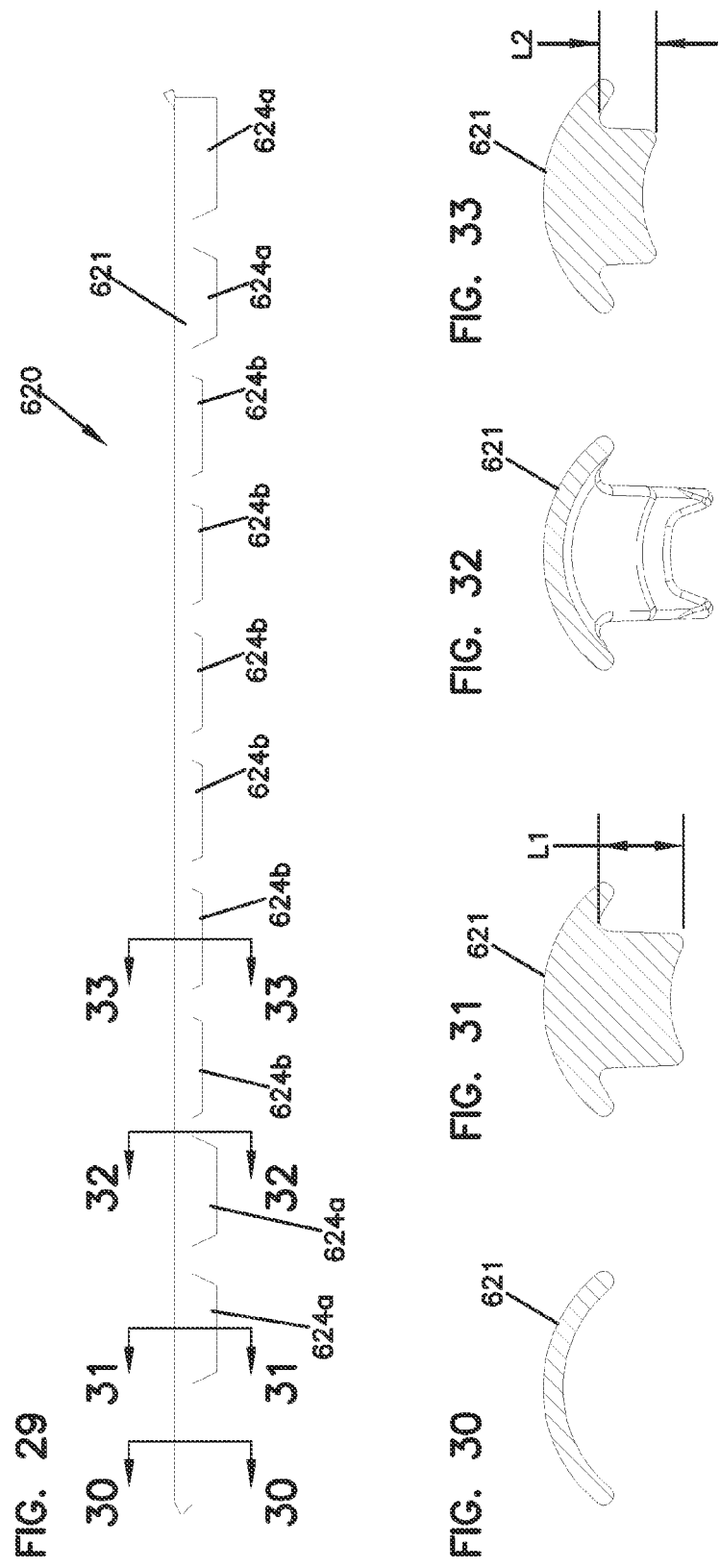

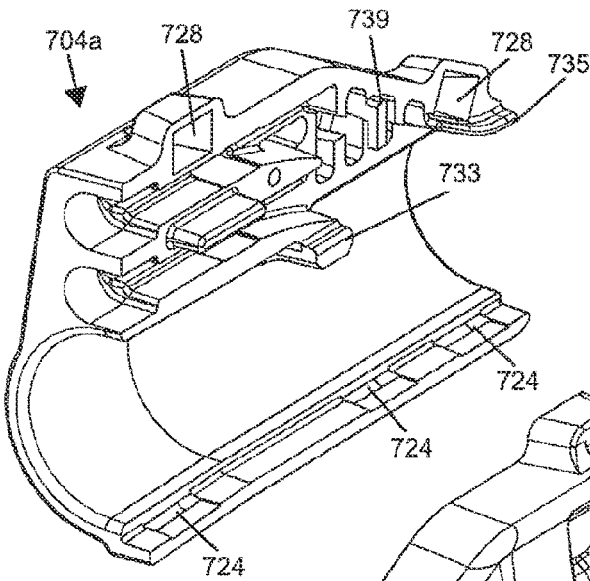
FIG.44
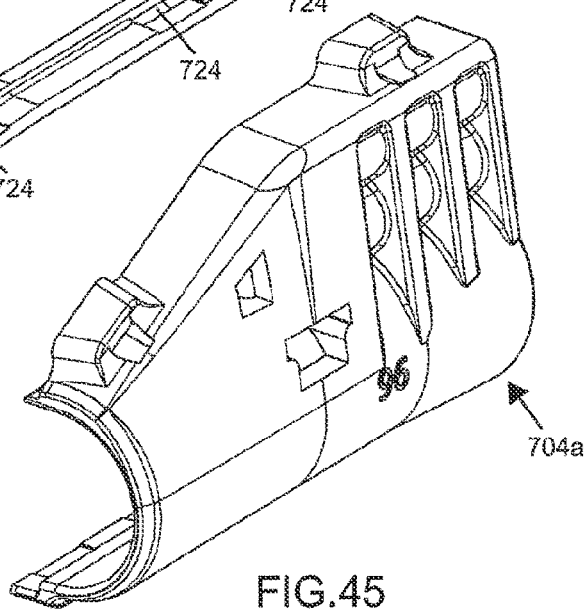
FIG.45
FIG.51
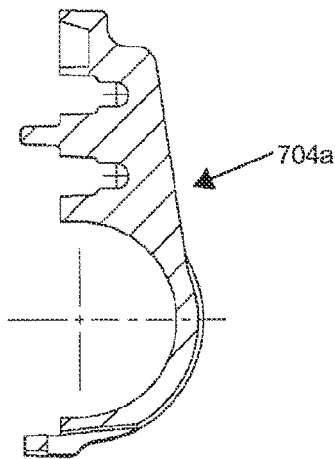

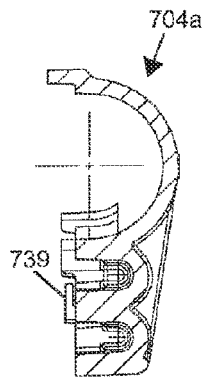
FIG.50
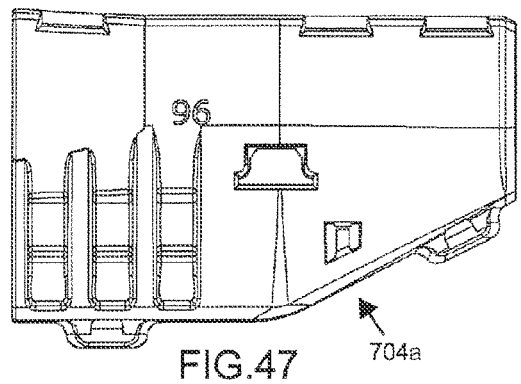
FIG.47
FIG.46
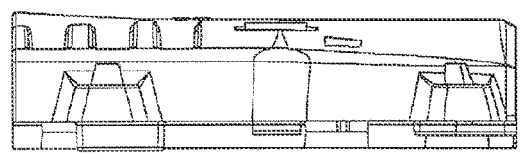
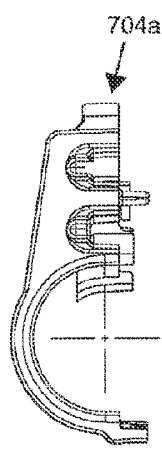
FIG.49
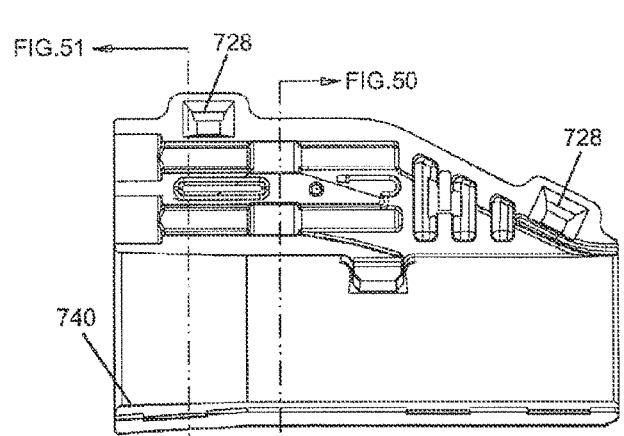
FIG.48

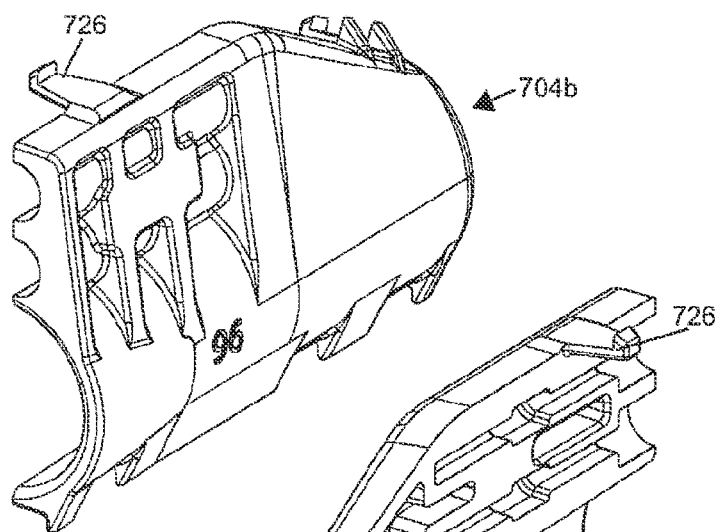
FIG.52
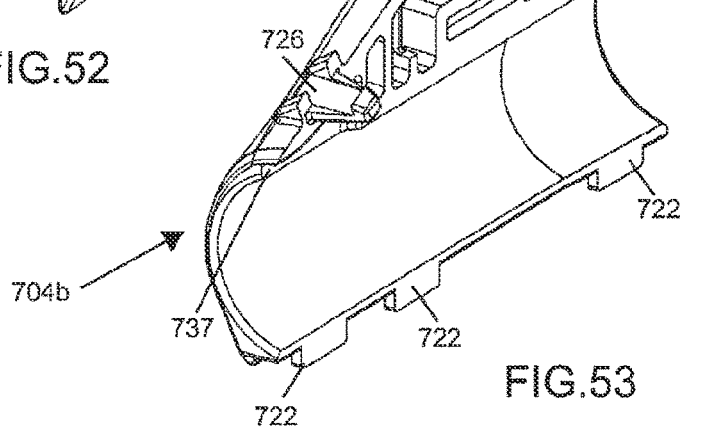
FIG.53
FIG.59
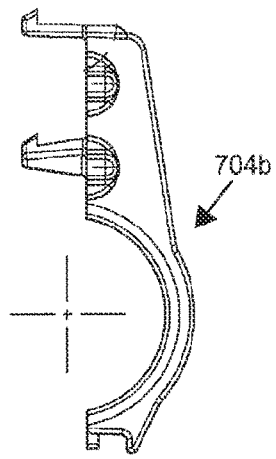

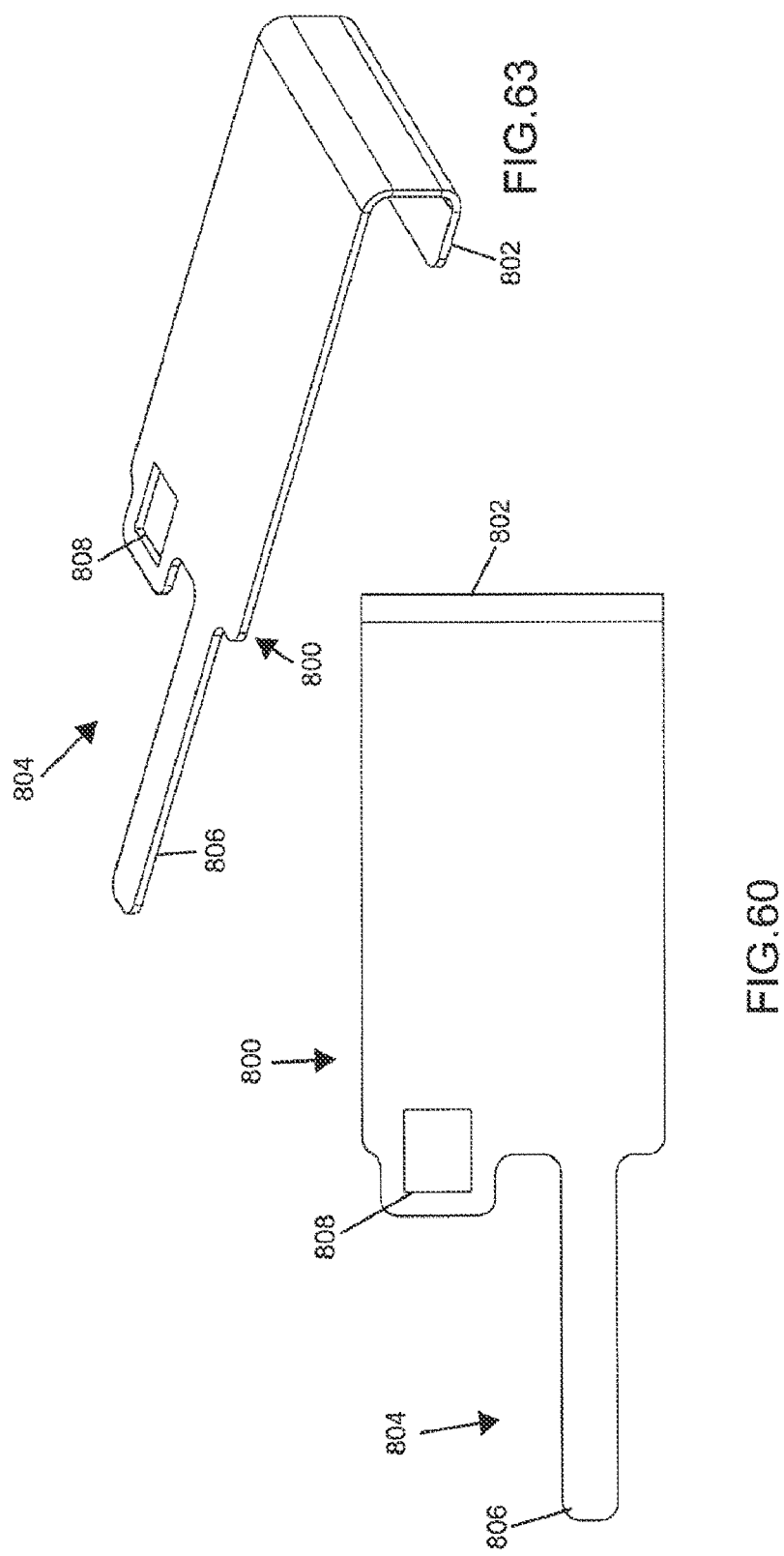

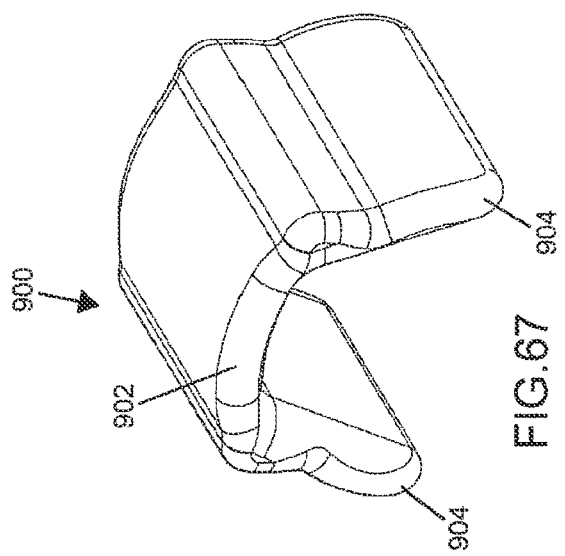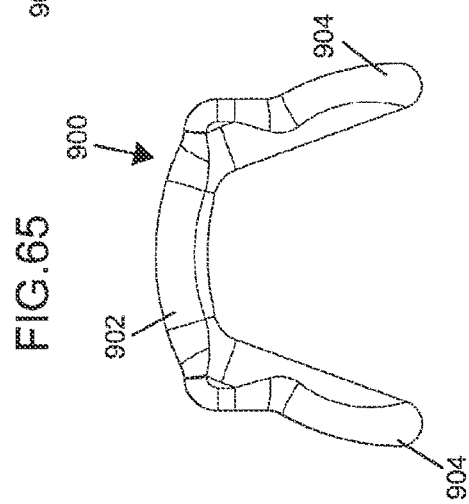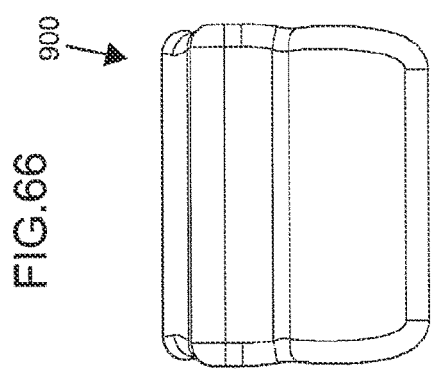

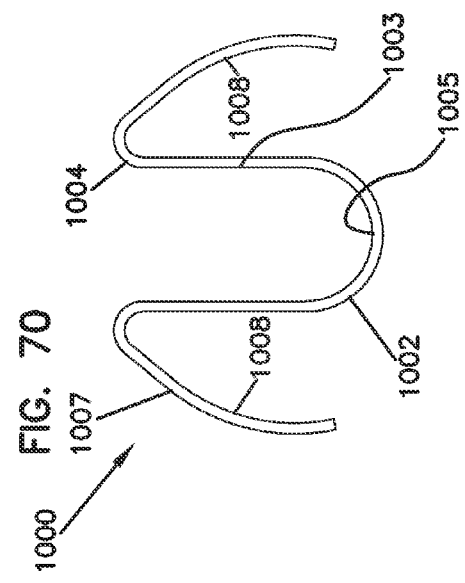
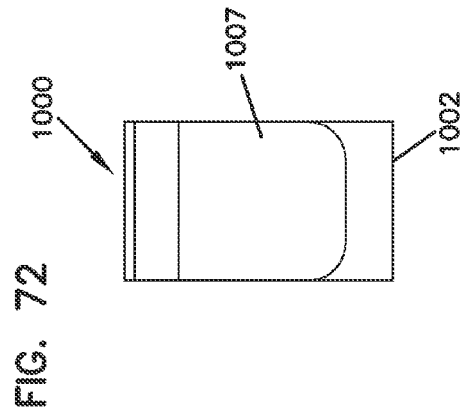
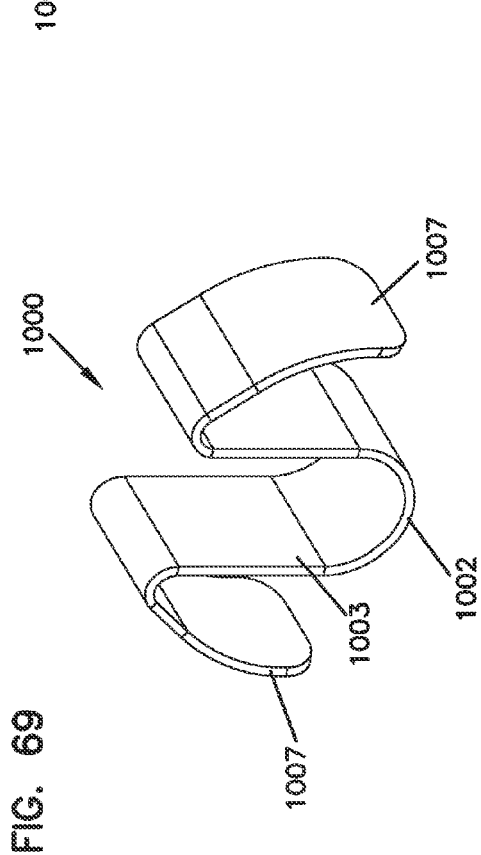
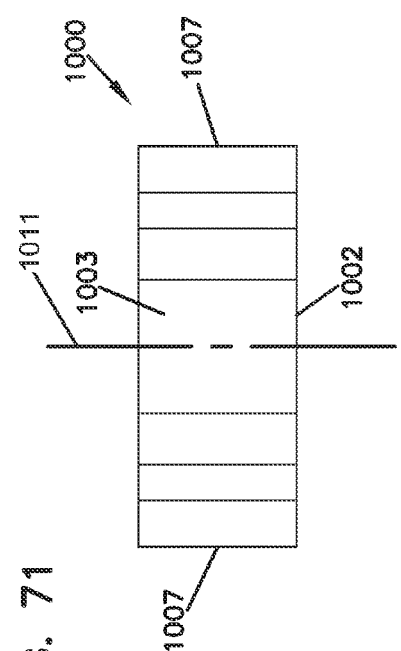

FACTORY SPLICED CABLE ASSEMBLY

CROSS REFERENCE TO RELATED APPLICATIONS

This application claims the benefit of U.S. Provisional Patent Application Ser. No. 60/976,054, filed Sep. 28, 2007. This application is also a continuation-in-part of U.S. patent application Ser. No. 11/837,862, filed Aug. 13, 2007, now U.S. Pat. No. 7,454,106, issued Nov. 18, 2008, which claims the benefit of U.S. Provisional Patent Application Ser. No. 60/950,521, filed Jul. 18, 2007 and U.S. Provisional Patent Application Ser. No. 60/837,481, filed Aug. 14, 2006. All of the aforementioned patent applications are hereby incorporated by reference in their entireties.

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of break-out locations 125 at which branch cables are separated out from main cable lines. Breakout locations can also be referred to as tap locations, drop cable locations, splice locations or branch locations. Branch cables can also be referred to as drop cables, drop lines, breakout cables or stub cables. Branch cables are often connected to drop terminals 104 that include connector interfaces for facilitating coupling the fibers of the branch cables to a plurality of different subscriber locations.

Branch cables can manually be separated out from a main cable in the field using field splices. Field splices are typically housed within sealed splice enclosures. Manual splicing in the field is time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). However, existing pre-terminated cable systems can be expensive because extra connectors at intermediate connection locations are often used. Moreover, the installation of pre-terminated cables can be difficult. For example, for underground applications, pre-terminations can complicate passing pre-terminated cable through the underground conduit typically used to hold fiber optic cable (e.g., 1.25 inch inner diameter conduit). Similarly, for aerial applications, pre-terminations can complicate passing pre-terminated cable through aerial cable retention loops.

SUMMARY

Certain aspects of the disclosure relate to fiber optic cable systems, packaging configurations and methods that facilitate the effective use and installation of pre-terminated fiber optic cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 6A is a top view of a tether prepared to be optically coupled to the distribution cable of FIG. 5;

FIG. 18 is a perspective view of the distribution cable of FIG. 13 with an over-mold installed over the breakout;

FIGS. 19-23 show another jacket support having features that are examples of inventive aspects in accordance with the principles of the present disclosure;

FIGS. 24-28 show a further jacket support having features that are examples of inventive aspects in accordance with the principles of the present disclosure;

FIGS. 29-33 show still another jacket support having features that are examples of inventive aspects in accordance with the principles of the present disclosure;

FIGS. 44-51 are various views of a first piece of the anchor block of FIGS. 37-43;

FIGS. 52-59 are various views of a second piece of the anchor block of FIGS. 37-43;

FIGS. 60-63 are various views of a cable reinforcing member having features that are examples of inventive aspects in accordance with the principles of the present disclosure;

FIGS. 65-67 are various views of another cable reinforcing member having features that are examples of inventive aspects in accordance with the principles of the present disclosure;

FIGS. 69-72 are various views of another cable reinforcing member having features that are examples of inventive aspects in accordance with the principles of the present disclosure;

DETAILED DESCRIPTION

The present disclosure relates to mid-span breakout arrangements provided on distribution cables. Each breakout arrangement is provided at a breakout location to protect the optical coupling of a tether to a distribution cable. A typical distribution cable includes a relatively large number of fibers (e.g., 72, 144 or more fibers). The fibers are typically organized within ribbons in a central portion of the distribution cable.

Figure 1:
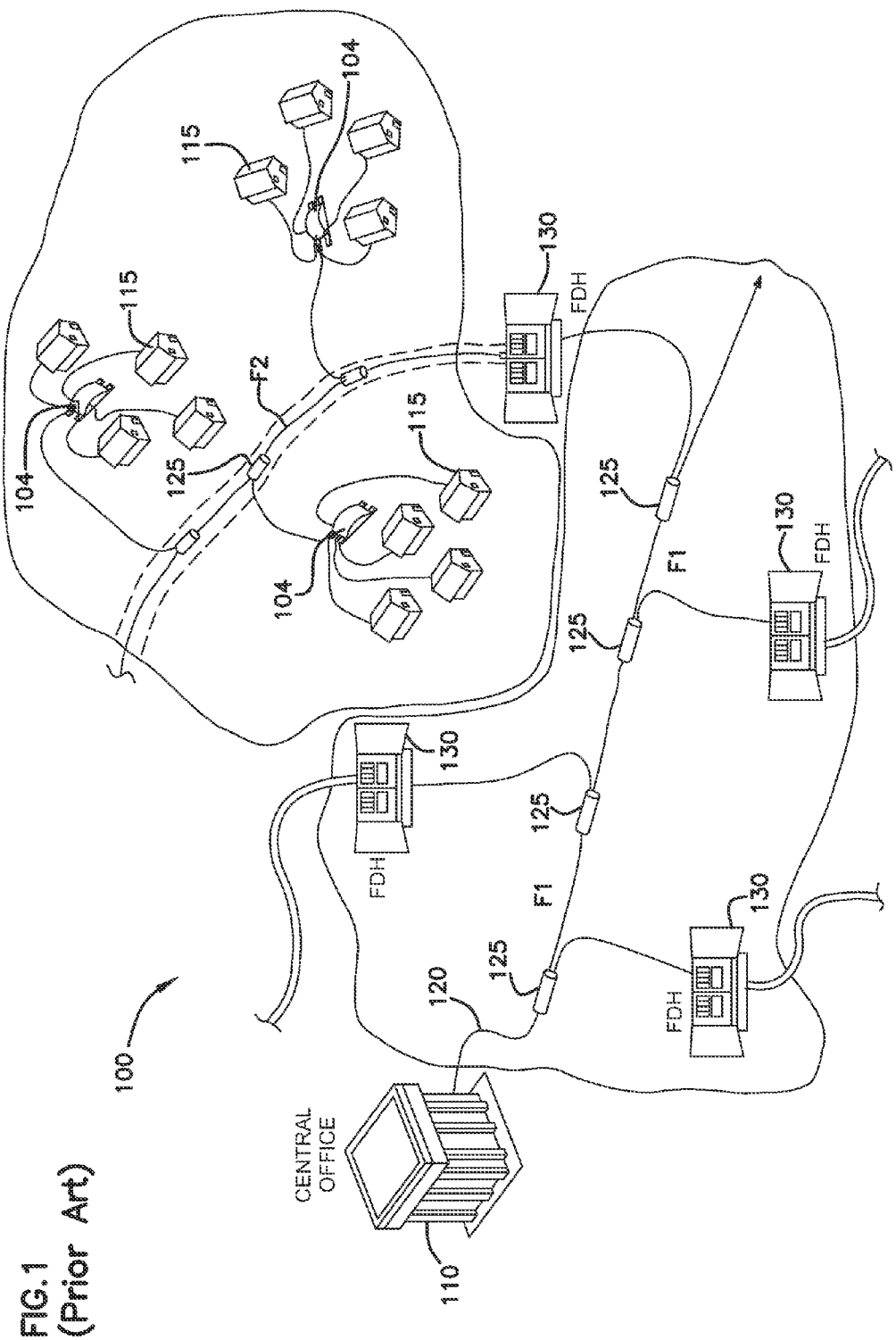
FIG. 1 shows a prior art passive fiber optic network.
Figure 2:
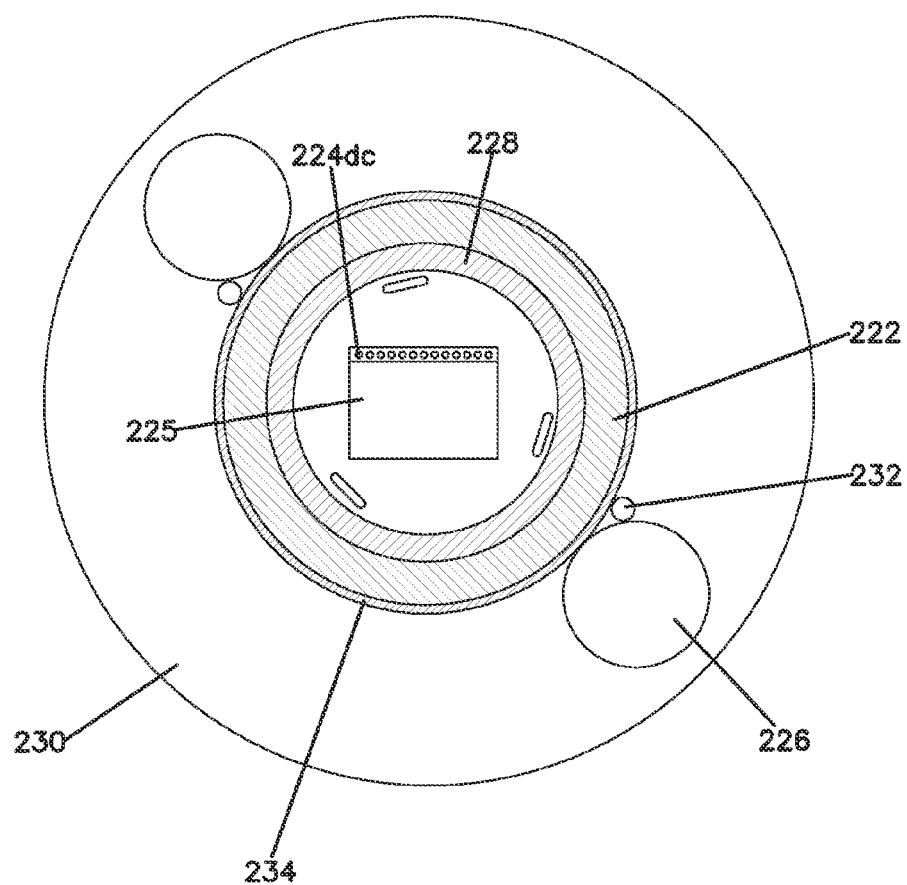
FIG. 2 is a cross-sectional view of an example distribution cable according to one embodiment of the present disclosure.

For example, FIG. 2 shows an example distribution cable 220 including a central buffer tube 222 enclosing a ribbon stack 225. Typically, a ribbon stack 225 includes approximately twelve ribbons and each ribbon contains about twelve fibers $224_{dc}$. For clarity, only twelve fibers $224_{dc}$ in the ribbon stack 225 are shown. The buffer tube 222 may include dry, water-blocking materials 228, such as yarn and/or tape. The distribution cable 220 also includes at least one, and preferably two or more, strength members 226 (e.g., flexible rods formed by glass fiber reinforced epoxy) for reinforcing the cable 220. An outer strength member (not shown), such as aramid fiber/yarn (e.g., Kevlar®), can surround the single buffer tube 222 within the jacket 230. The distribution cable 220 further includes an outer jacket 230 that encloses the ribbon stack 225 and the strength members 226. Ripcords 232 can be provided for facilitating tearing away portions of the jacket 230 to access the fibers of the ribbon stack 225 within the jacket 230.

Figure 4:
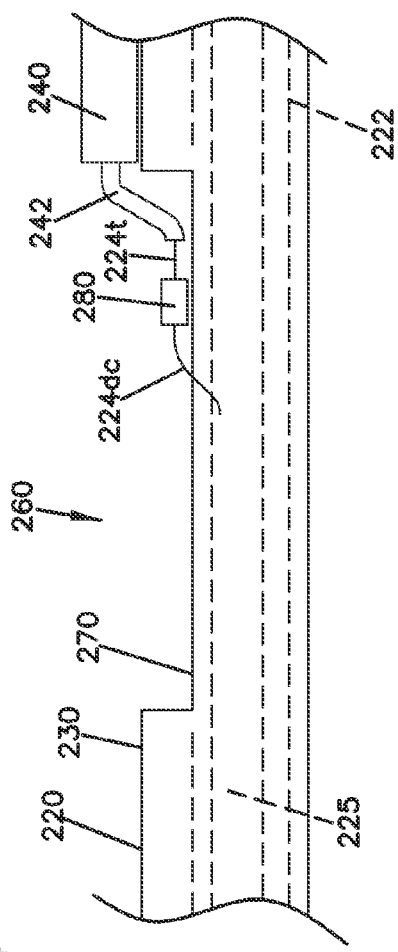
FIG. 4 is a schematic view of an example tether coupled to a distribution cable at a breakout location having features that are examples of inventive aspects in accordance with the principles of the present disclosure.

A typical mid-span breakout location is provided at an intermediate point along the length of a distribution cable (e.g., see FIG. 4). Commonly a tether (e.g., a drop cable or a stub cable) branches out from the distribution cable at the breakout location. The tether most commonly has a fewer number of fibers as compared to the number of fibers provided within the distribution cable. In an example embodiment, the tether has no more than twelve fibers. The tether includes fibers that extend between first and second ends. The first ends of the tether fibers are preferably spliced to selected fibers of the distribution cable at the breakout location. The second ends of the tether fibers can either be connectorized or unconnectorized. In one embodiment, the end of each tether is connectorized with a multi-fiber connector having a multi-fiber ferrule in which the second ends of the tether fibers of the corresponding tether are mounted.

Figure 3:
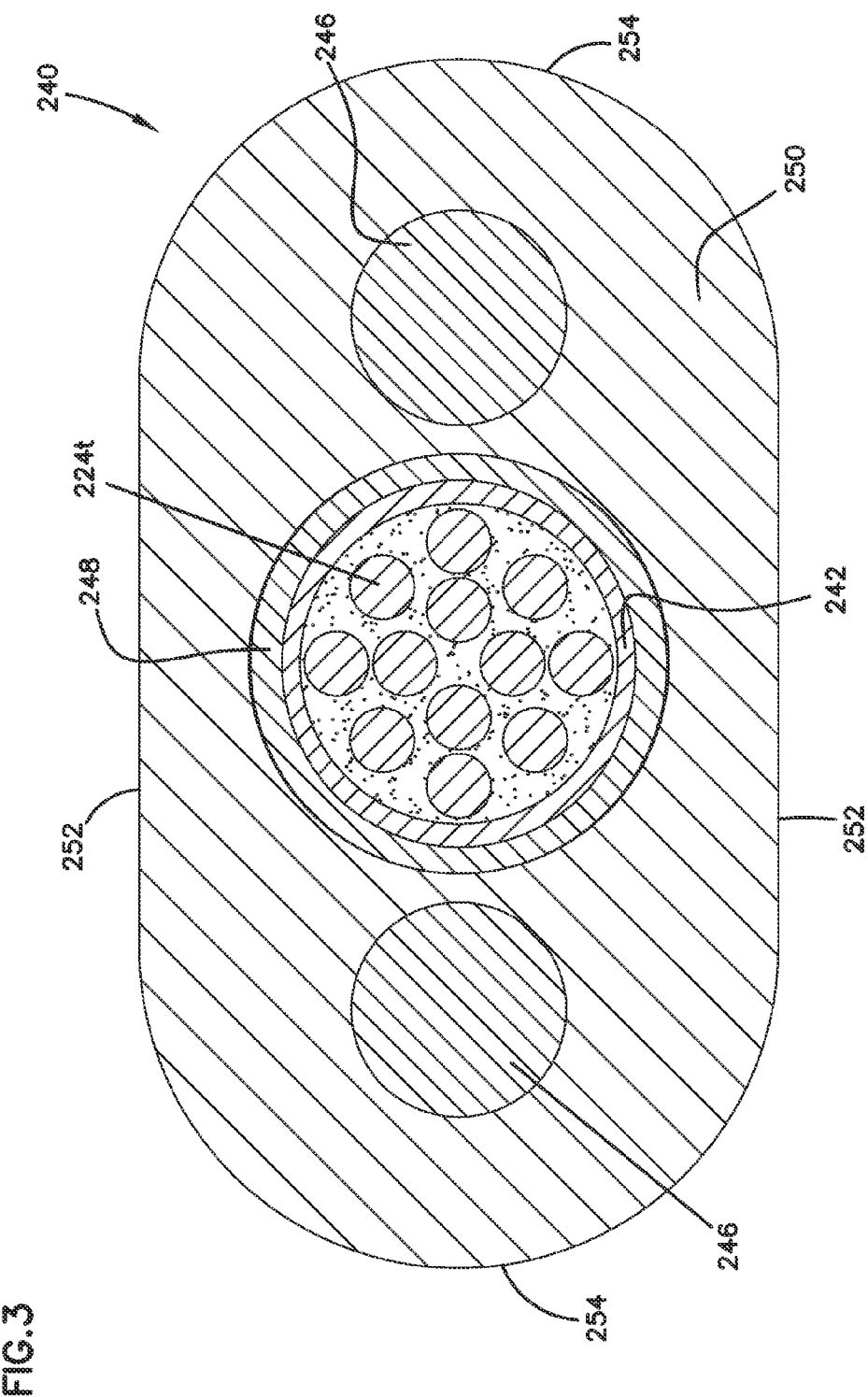
FIG. 3 is a cross-sectional view of an example tether according to one embodiment of the present disclosure.

FIG. 3 illustrates a tether cable 240 configured to join to the distribution cable 220 (e.g., at a breakout location 260). The tether 240 is depicted as having a flat cable configuration. The flat cable configuration includes a central buffer tube 242 containing a plurality of fibers $224_t$ (e.g., typically one to twelve loose or ribbonized fibers). Strength members 246 (e.g., flexible rods formed by glass fiber reinforced epoxy) are positioned on opposite sides of the central buffer tube 242. An outer jacket 250 surrounds the strength members 246 and the buffer tube 242.

In the example shown, the outer jacket 250 includes an outer perimeter having an elongated transverse cross-sectional shape. An additional strength layer 248 (e.g., aramid fiber/yarn) can be positioned between the buffer tube 242 and the outer jacket 250. As shown at FIG. 3, the transverse cross-sectional shape includes oppositely positioned, generally parallel sides 252 interconnected by rounded ends 254.

However, any suitable cable configuration can be utilized for both the distribution cable and the tether cable.

Referring now to FIG. 4, one or more tethers 240 can optically couple to a distribution cable 220. Each tether 240 branches outwardly from the distribution cable 220 at a breakout location 260. The breakout location 260 includes a coupling location 280 where selected ribbonized fibers $224_{dc}$ of the distribution cable 220 are optically coupled (e.g., spliced) to corresponding fibers $224_t$ of the tether 240. It is preferred for the fibers $224_t$ of the tether 240 to be pre-terminated to the fibers $224_{dc}$ of the distribution cable 220. "Pre-terminated" means that the fibers $224_t$ are fused (e.g., spliced) or otherwise optically coupled to the fibers $224_{dc}$ of the distribution cable 220 at the factory as part of the cable manufacturing process rather than being field terminated. The remainder of the breakout assembly 200 is also preferably factory installed.

In general, the coupling location 280 is recessed within the outer jacket 230 of the distribution cable 220 along with the ribbonized fibers $224_{dc}$ and an end portion of the tether buffer tube 242. Positioning the coupling location 280 within the outer jacket 230 of the distribution cable 220 provides a smaller transverse cross-section of the breakout location 260.

Figure 5:
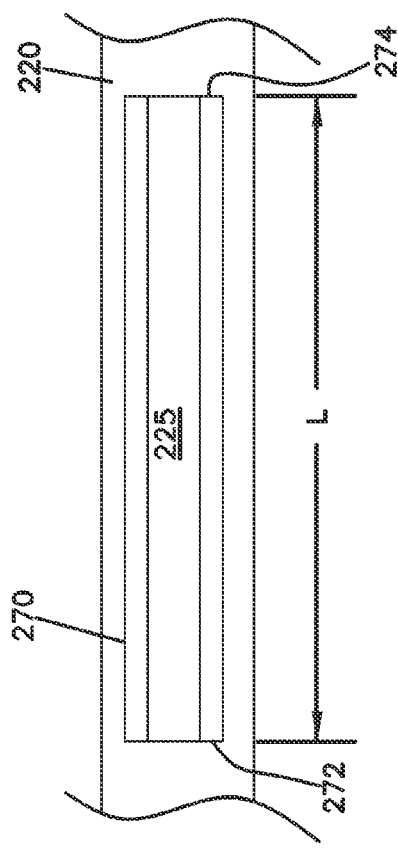
FIG. 5 is a top view of a distribution cable having a cut having features that are examples of inventive aspects in accordance with the principles of the present disclosure.

Referring now to FIG. 5, to prepare the breakout location 260 on the distribution cable 220, a portion of the jacket 230 and the buffer tube 222 is first cut away to provide a cut region 270 (e.g., a rectangular access slot cut through the jacket 230 and the buffer tube 222). The cut region 270 extends along a length L from a first end 272 and a second, opposite end 274. The ribbon stack 225 is accessible through the cut region 270. One or more of the ribbons of the ribbon stack 225 are then selected and the fibers $224_{dc}$ of the selected ribbons are accessed. With the distribution cable 220 prepared as shown in FIG. 5, the fibers $224_{dc}$ are ready to be terminated to a prepared tether 240.

Figure 6B:
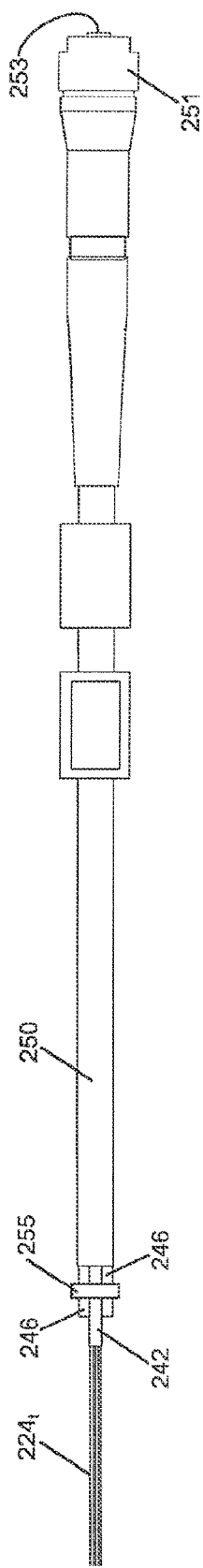
FIG. 6B is a top view of the tether of FIG. 6A including a multi-fiber connector located at the end of the tether.
Figure 7:
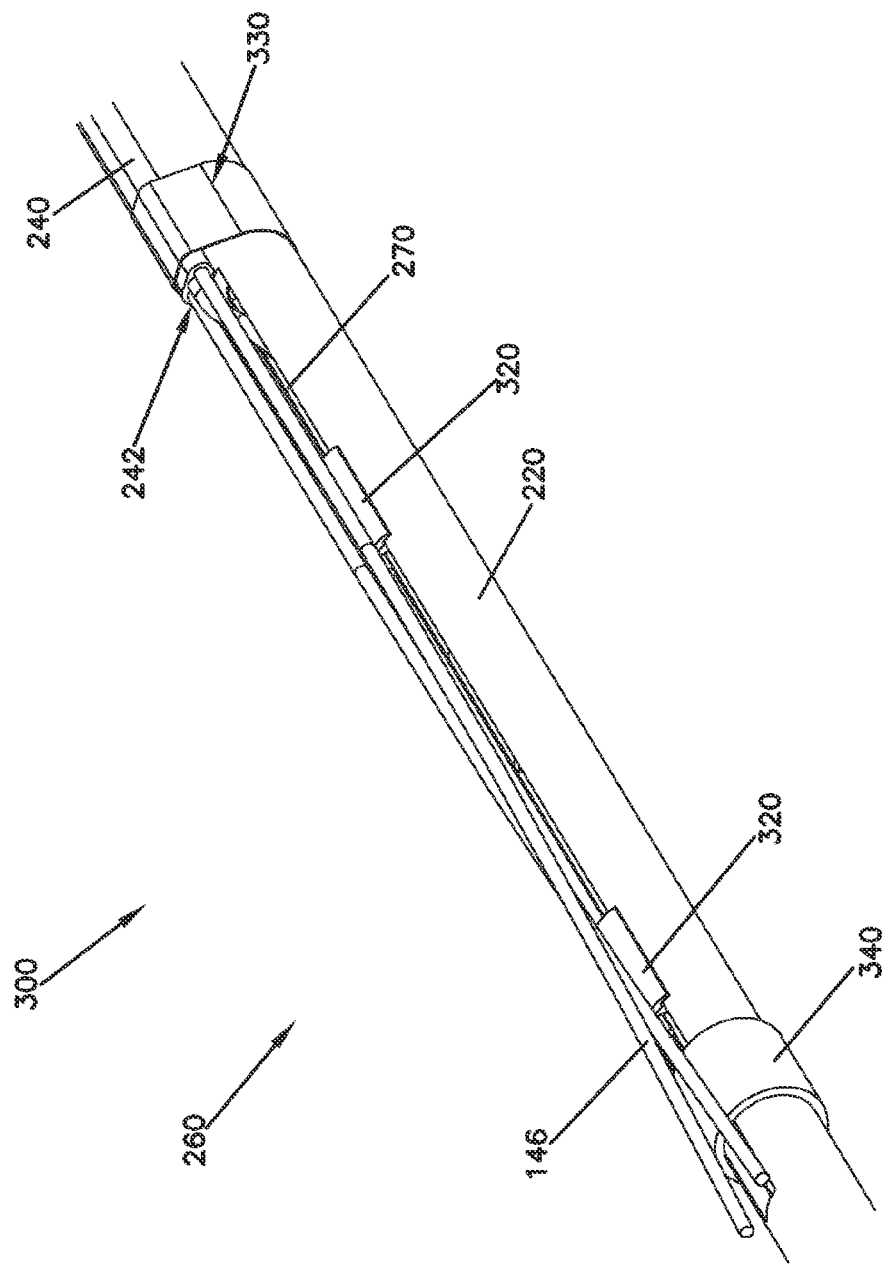
FIG. 7 is a perspective view of a first breakout assembly installed on a distribution cable at a breakout location having features that are examples of inventive aspects in accordance with the principles of the present disclosure.
Figure 10:
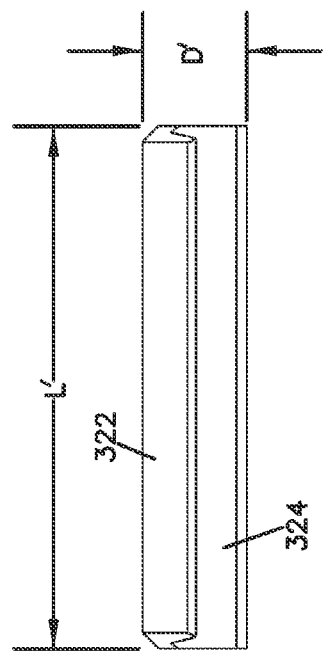
FIG. 10 is a side view of the jacket support of FIG. 8.
Figure 11:
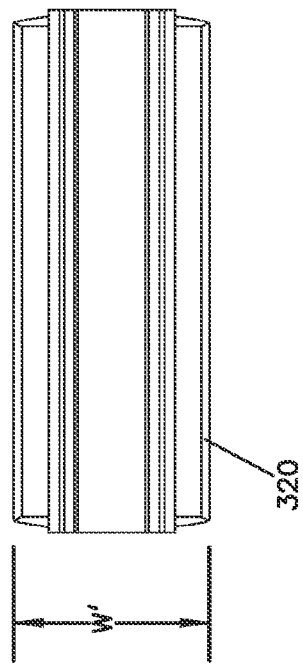
FIG. 11 is a bottom view of the jacket support of FIG. 8.
Figure 8:
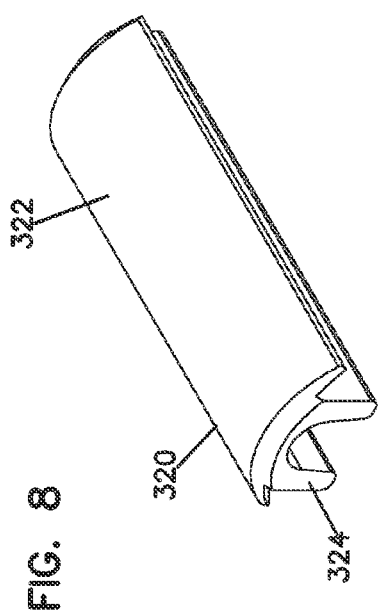
FIG. 8 is a front perspective view of an example jacket support having features that are examples of inventive aspects in accordance with the principles of the present disclosure.
Figure 9:
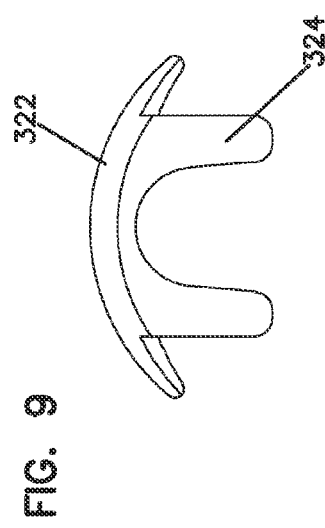
FIG. 9 is an end view of the jacket support of FIG. 8.

To prepare the tether 240 to be incorporated into the breakout assembly 300 (e.g., see FIG. 7), a portion of the outer jacket 250 is stripped away to expose the central buffer tube 242 and the strength members 246 (see FIG. 6A). As shown at FIG. 6A, the central buffer tube 242 and the strength members 246 project outwardly beyond an end 258 of the outer jacket 250. The strength layer 248 has been removed from around the buffer tube 242. After removing the outer jacket 250, an end portion of the central buffer tube 242 is removed to expose the fibers $224_t$. FIG. 6B shows the tether 240 including a multi-fiber connector 251 (e.g., a 12 fiber multi-fiber connector having a ferrule 253 that can receive 12 fibers) located at the end of the tether distal from the breakout location 260. Once again, the end of the tether 240 prepared to be mechanically and optically coupled to the distribution cable 220 at the breakout location 260 includes end portions of fibers $224_t$ exposed from the buffer tube 242. Also, the jacket 250 has been stripped to expose end portions of the buffer tube 242 and the strength members 246. A mechanical crimp member 255 can be crimped to exposed end portions of the strength members 246. In other embodiments, the crimp member can be crimped over the tether jacket 250.

The prepared tether 240 is optically coupled to the distribution cable 220 at the coupling location 280 using known coupling techniques (e.g., a fusion splice technique). A coupling protector (i.e., a splice protection sleeve) can be positioned over the spliced fibers $224_{dc}$, $224_t$ at the coupling location 280. Typically, the coupling protector is configured to heat shrink to fit the fibers 224. For example, the coupling protector can include a strength member, inner meltable adhesive tube, and polyolefin outer tube. The strength member of the coupling protector can be stainless steel or fiberglass. Example splice protection sleeves are disclosed at U.S. Pat. No. 5,731,051, that is hereby incorporated by reference in its entirety. It will be appreciated that a splice sleeve can hold/protect a single splice or multiple splices. In one embodiment, one splice sleeve is used to hold all of the splices corresponding to a given tether.

The coupling protector is inserted within the cut region 270 of the distribution cable 220 so as to be recessed below/inside the cable jacket 230 as shown in FIG. 4. In one embodiment, the outer perimeter (i.e., the outer diameter) of the cable jacket 230 defines an outer boundary within which the coupled fibers $224_{dc}$, $224_t$ are arranged. In a preferred embodiment, an end portion of the tether buffer tube 242 can also be inserted within the outer boundary through the cut region 270. The buffer tube 242 and coupling protector can be secured using tape, adhesive, or any desired fastener. The tether 240 can be secured to the distribution cable 220 adjacent the cut region 270 using a breakout assembly as described herein.

Referring now to FIGS. 7-12, one example of a breakout assembly 300 having features that are examples of inventive aspects in accordance with the principles of the present disclosure is shown. In the example shown in FIG. 7, the breakout assembly 300 includes jacket supports 320, a fastener 330, and a spacer 340. The fastener 330 secures the tether 240 to the distribution cable 220 at the second end 274 of the cut region 270. In one embodiment, the fastener 330 includes a strip of tape wound around the tether 240 and the distribution cable 220. In another embodiment, the fastener 330 includes a hose clamp.

The spacer 340 is located at the first end 272 of the cut region 270. The spacer is generally configured to protrude radially outwardly from the distribution cable a distance of less than about 0.2 inches. In one example embodiment, the spacer 340 includes a strip of tape wound multiple times around the distribution cable 220 adjacent the first end 272 of the cut region 270. In other embodiments, however, the spacer 340 can include any desired structure configured to protrude radially outwardly from the distribution cable 220.

The jacket supports 320 are positioned within the cut region 270 to inhibit excess bending of the ribbon stack 225 along the cut region 270. In the example shown in FIGS. 8-11, the jacket supports 320 include legs 324 configured to fit within the cut region 270 of the distribution cable 220 and a curved surface 322 configured to extend over the cut region 270. In general, the jacket supports 320 have a length L' ranging from about 0.5 inches to about 2 inches, a width W' ranging from about 0.25 inches to about 0.75 inches, and a depth D' of about 0.1 inches to about 0.4 inches. Typically, the jacket supports 320 have a length L' of about 1.0 inches, a width W' of about 0.37 inches, and a depth D' of about 0.2 inches.

FIGS. 20-23 and 24-28 respectively show two alternative jacket supports 520a, 520b adapted for use in reinforcing the cut region 270 of a breakout location. The jacket supports 520a, 520b have flanges 521a, 521b that are curved to match the outer diameter of the cable jacket 230. The jacket supports 520a, 520b also include legs 524a, 524b that project outwardly from the flanges 521a, 521b. The legs 524a, 524b are sized to fit within the cut region 270. When installed at the cut region 270, the legs 524a, 524b fit within the cut region 270 and the flanges overlap the outer diameter of the cable jacket 230 at opposite sides of the cut region 270. The leg 524a has a length L1 that is longer than a corresponding length L2 of the leg 524b. The length L1 is selected so that the leg 524a is sufficiently long to extend through the cable jacket 230 and at least partially into the buffer tube 222 when the jacket support 520a is mounted at the cut region 270. The length L2 is selected so that the leg 524b does not extend into the buffer tube 222 when the jacket support 520b is mounted at the cut region 270. To reinforce the full cut region 270, it is preferred for a plurality of the jacket supports 520a and a plurality of the jacket supports 520b to be positioned along the length of the cut region 270. To provide clearance within the cable 220 for the splice sleeves, the jacket supports 520b can be mounted at locations of the cut region 270 in which the jacket supports are arranged to cover the splice sleeves. In contrast, the jacket supports 520a can be mounted at locations of the cut region 270 that are axially offset from the splice sleeves. Typically, the jacket supports 520b will be arranged at a mid-region of the cut region 270, and the jacket supports 520a will be arranged adjacent the ends 272, 274 of the cut region 270.

Figure 34:
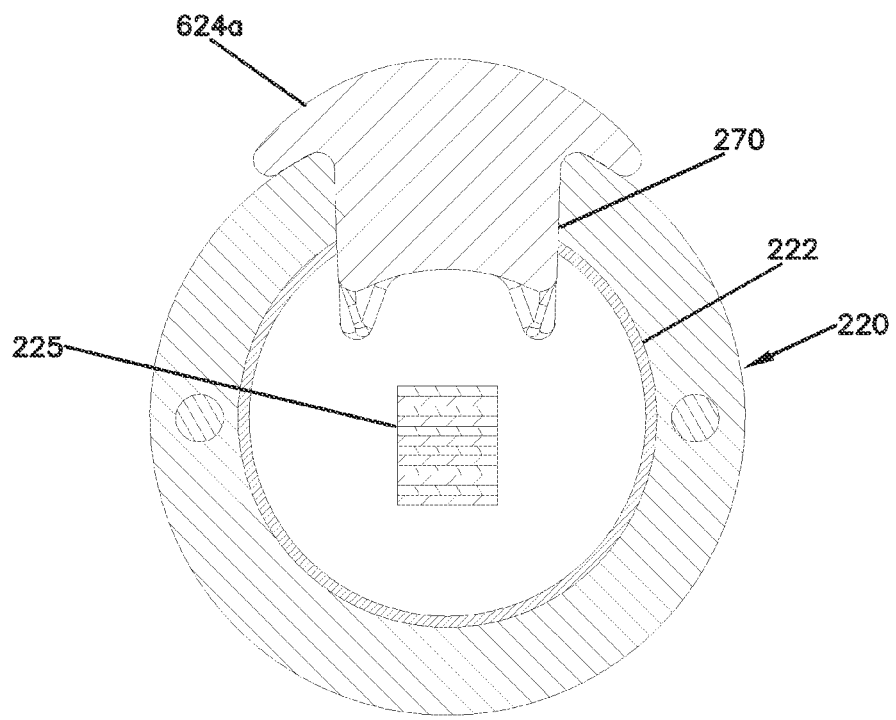
FIGS. 34 and 35 are cross-sectional views showing the jacket support of FIGS. 29-33 mounted in a cut region of a distribution cable.
Figure 35:
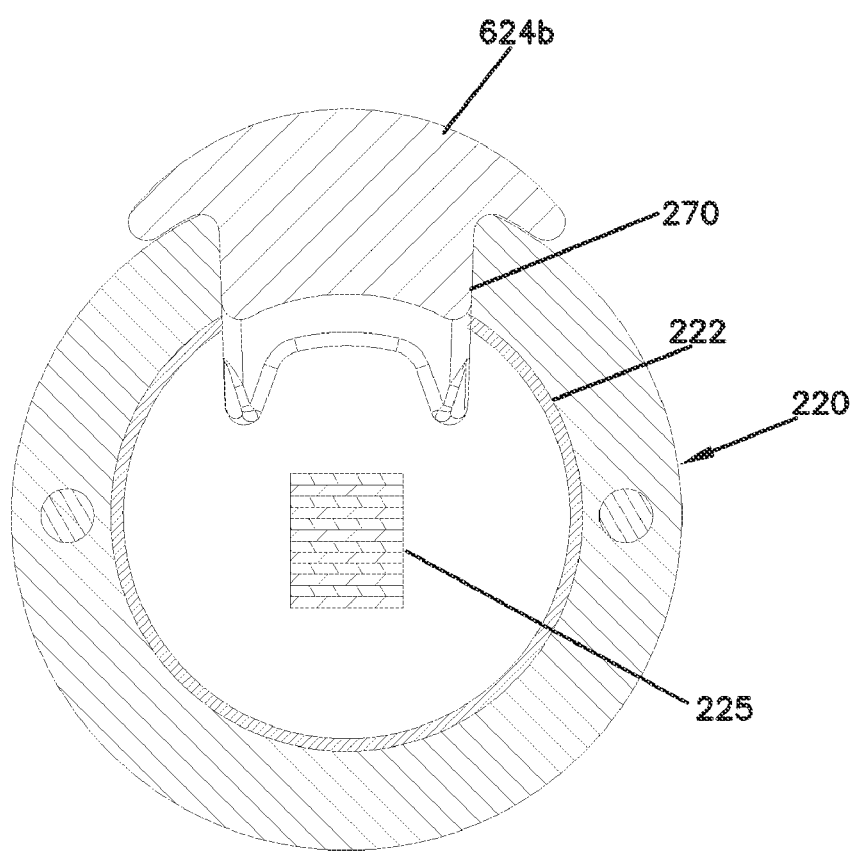

FIGS. 29-33 show another jacket support 620 adapted for use in reinforcing the cut region 270 of a breakout location. The jacket support 620 is a reinforcing strip having a length that generally equals the length of the cut region 270. The jacket support 620 has a flange 621 that are curved to match the outer diameter of the cable jacket 230. The jacket support 620 also includes legs 624a, 624b that project outwardly from the flange 621. The legs 624a, 624b are sized to fit within the cut region 270. When installed at the cut region 270, the legs 624a, 624b fit within the cut region 270 and the flange 621 overlaps the outer diameter of the cable jacket 230 at opposite sides of the cut region 270. The leg 624a has a length L1 that is longer than a corresponding length L2 of the leg 624b. The length L1 is selected so that the leg 624a is sufficiently long to extend through the cable jacket 230 and at least partially into the buffer tube 222 (see FIG. 34) when the jacket support 620 is mounted at the cut region 270. The length L2 is selected so that the leg 624b does not extend into the buffer tube 222 (see FIG. 35) when the jacket support 620 is mounted at the cut region 270. Flex locations 626 are provided between the legs of the jacket support 620 to allow the jacket support 620 to flex with the distribution cable 220. When assembled at the cut region 270, splice sleeves are preferably mounted beneath the legs 640b to provide clearance for the splice sleeves.

Figure 12:
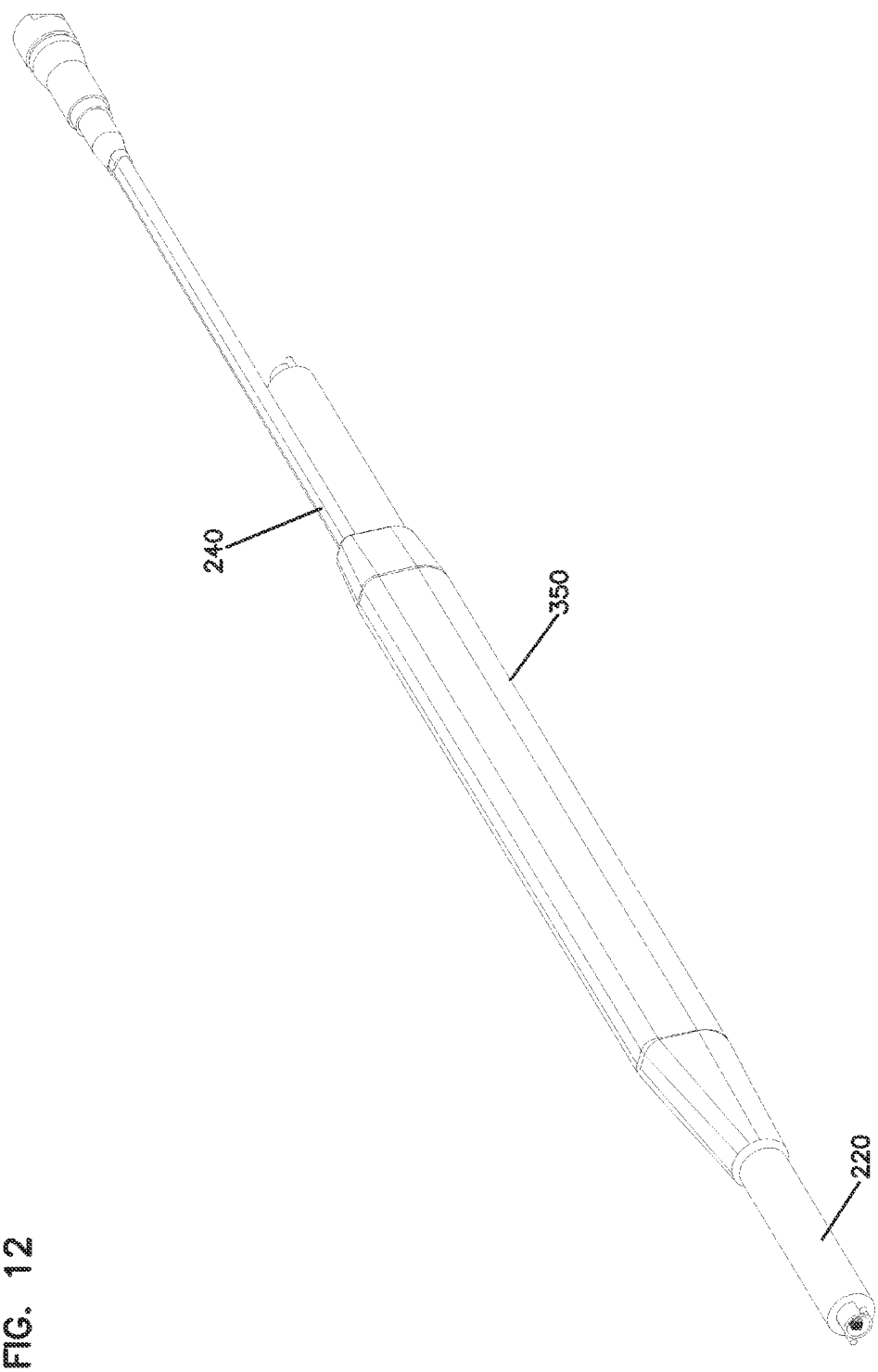
FIG. 12 is a perspective view of the distribution cable of FIG. 7 with an over-mold installed over the breakout location according to one embodiment of the present disclosure.

The breakout assembly 300 also includes an over-mold 350 that encloses and seals the cut region 270 of the distribution cable 220 from the fastener 330 to the ends of the tether strength members 246 (e.g., see FIG. 12). In certain embodiments, a wrap of heat resistant tape (e.g., silicone tape) can provide an intermediate layer between the distribution cable 220 and the over-mold 350.

The over-mold 350 is preferably made of a flexible polymer plastic material. It is preferred for the over-mold 350 to be sized with a cross sectional shape sufficient to allow the breakout location to be readily passed through a one and one-half inch inner diameter conduit or a one and one-quarter inch diameter conduit. In certain embodiments, the breakout location 260 has a cross sectional area that can be passed through a one inch inner diameter conduit.

Referring now to FIGS. 13-18, an alternative example of a breakout assembly 400 having features that are examples of inventive aspects in accordance with the principles of the present disclosure is shown. The breakout assembly 400 includes a coupling protector (e.g., as described above) positioned over the fibers $224_{dc}$, $224_t$ at the coupling location 280.

Figure 13:
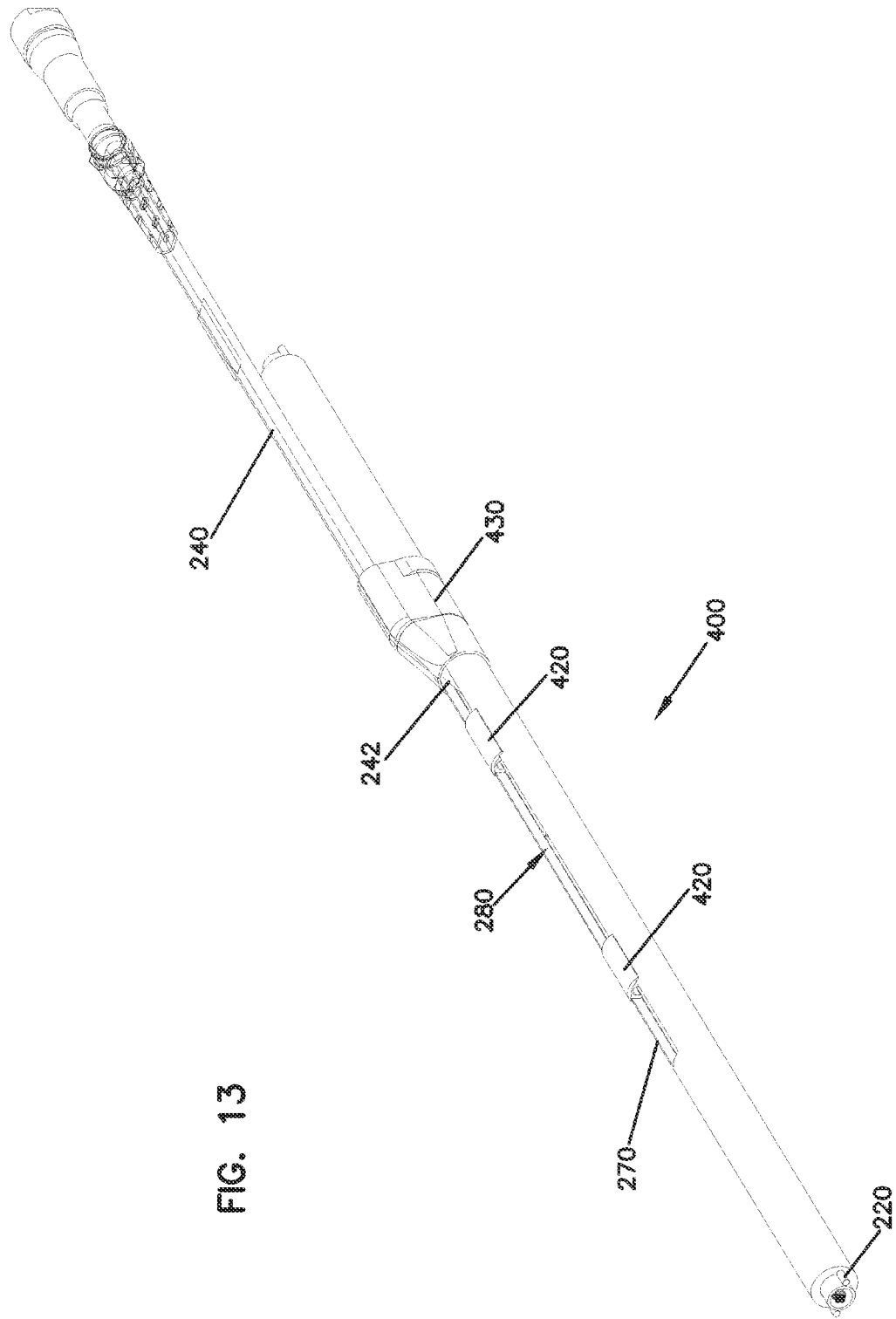
FIG. 13 is a perspective view of a second breakout assembly installed on a distribution cable at a breakout location having features that are examples of inventive aspects in accordance with the principles of the present disclosure.

In the example shown in FIG. 13, the breakout assembly 400 includes at least one jacket support 420 and a transition block 430. In general, the jacket supports 420 resemble the jacket supports 320 discussed above with reference to FIGS. 7-12. In a preferred embodiment, three jacket supports 420 are provided in the cut region 270 of the distribution cable 220. For clarity, two jacket supports 420 are shown in FIG. 13.

The transition block 430 secures the tether 240 to the distribution cable 220 at the second end 274 of the cut region 270. The strength members 246 of the tether 240 can be secured to the transition block 430 to strengthen the mechanical interface between the tether 240 and the distribution cable 220. The transition block 430 can also provide a path along which the tether buffer tube 242 can be routed into the cut region 270 of the distribution cable 220.

Figure 14:
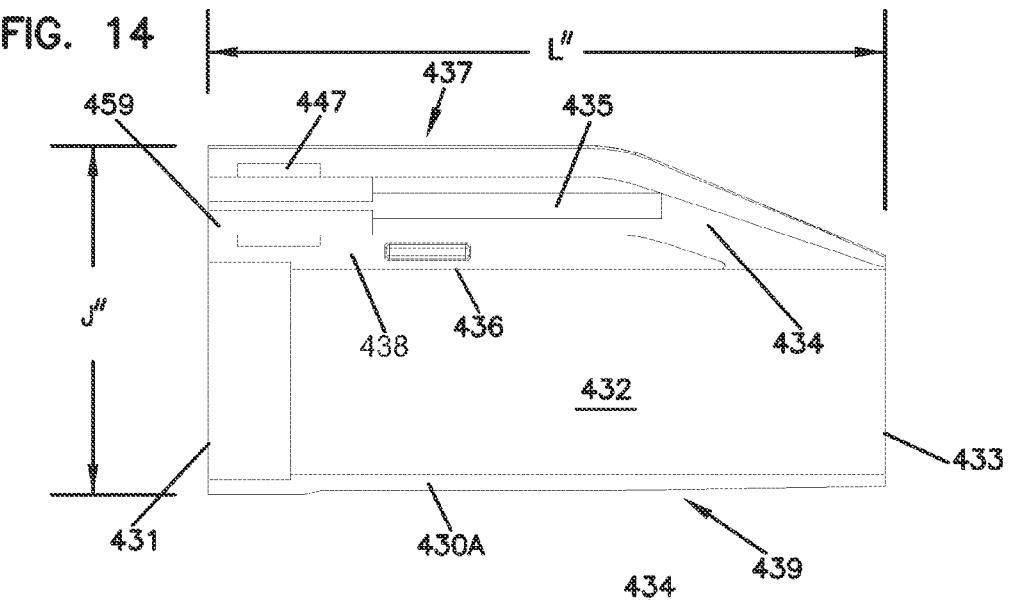
FIG. 14 is a side view of an example transition block according to one embodiment of the present disclosure.
Figure 15:
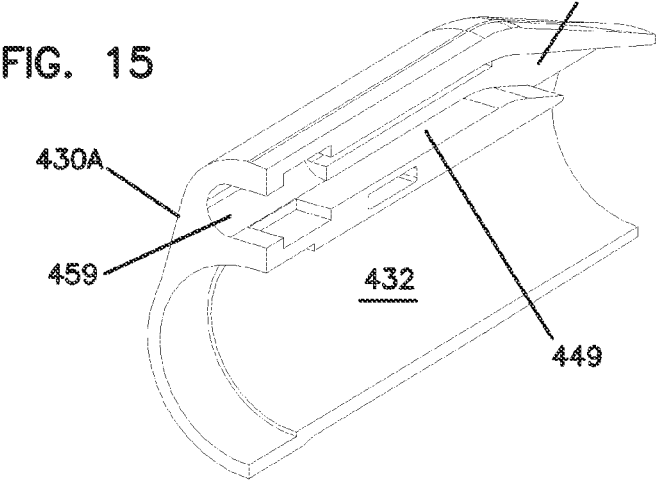
FIG. 15 is a perspective view of the transition block of FIG. 14.
Figure 16:
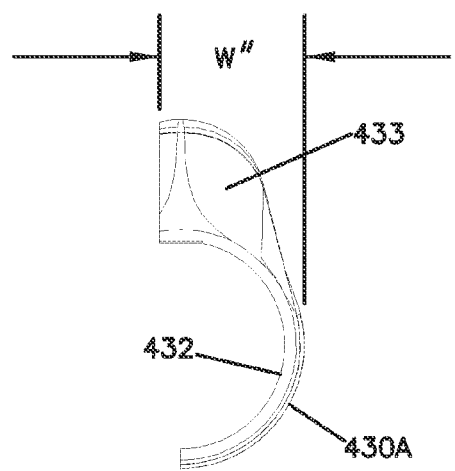
FIG. 16 is an end view of the transition block of FIG. 14.

In certain embodiments, the transition block 430 includes two body members configured to secure together. In some embodiments, the two body members are mirror-images of one another. In other embodiments, however, one of the body members is wider than the other body member to facilitate mounting the tether 240 to the wider body member. For example, FIGS. 14-16 illustrate a first body member 430A configured to couple to a narrower body member (not shown) to form the transition block 430 shown in FIG. 13.

The body member 430A extends along a length L" from a first end 431 to a second, opposite end 433. The body member 430A has a top side 437 and a bottom side 439. The bottom side 439 of the body member 430A defines a first channel 432 configured to receive the outer jacket 230 of the distribution cable 220. The first channel 432 extends substantially linearly from the first end 431 to the second end 433 of the body member 430A.

In general, the body member 430A has a length L" ranging from about 1.5 to about 3.0 inches, a width W" ranging from about 0.25 inches to about 1.0 inches, and a depth D" ranging from about 0.75 to about 1.25 inches. In a preferred embodiment, the body member 430A has a length L" of about 2 inches, a width W" of about 0.4 inches and a depth D" of about 1 inch. The transition block 430 has a width equal to the width W" of the first body member 430A and the width of the second body member (not shown). In one example embodiment, the transition block 430 has a width of about 0.7 inches.

The top side 437 of the body member 430A defines a second channel 434 configured adjacent the first end 431 to extend generally parallel with the first channel 432 and configured adjacent the second end 433 to taper downwardly to the first channel 432. A separating member 438 extends between and defines the first and second channels 432, 434. The separating member 438 can include a fastening member 436 configured to engage with a corresponding fastening member on the second body member (not shown). In a preferred embodiment, the fastening member 436 can include a hole configured to receive a protruding fastening member on the second body member.

Figure 17:
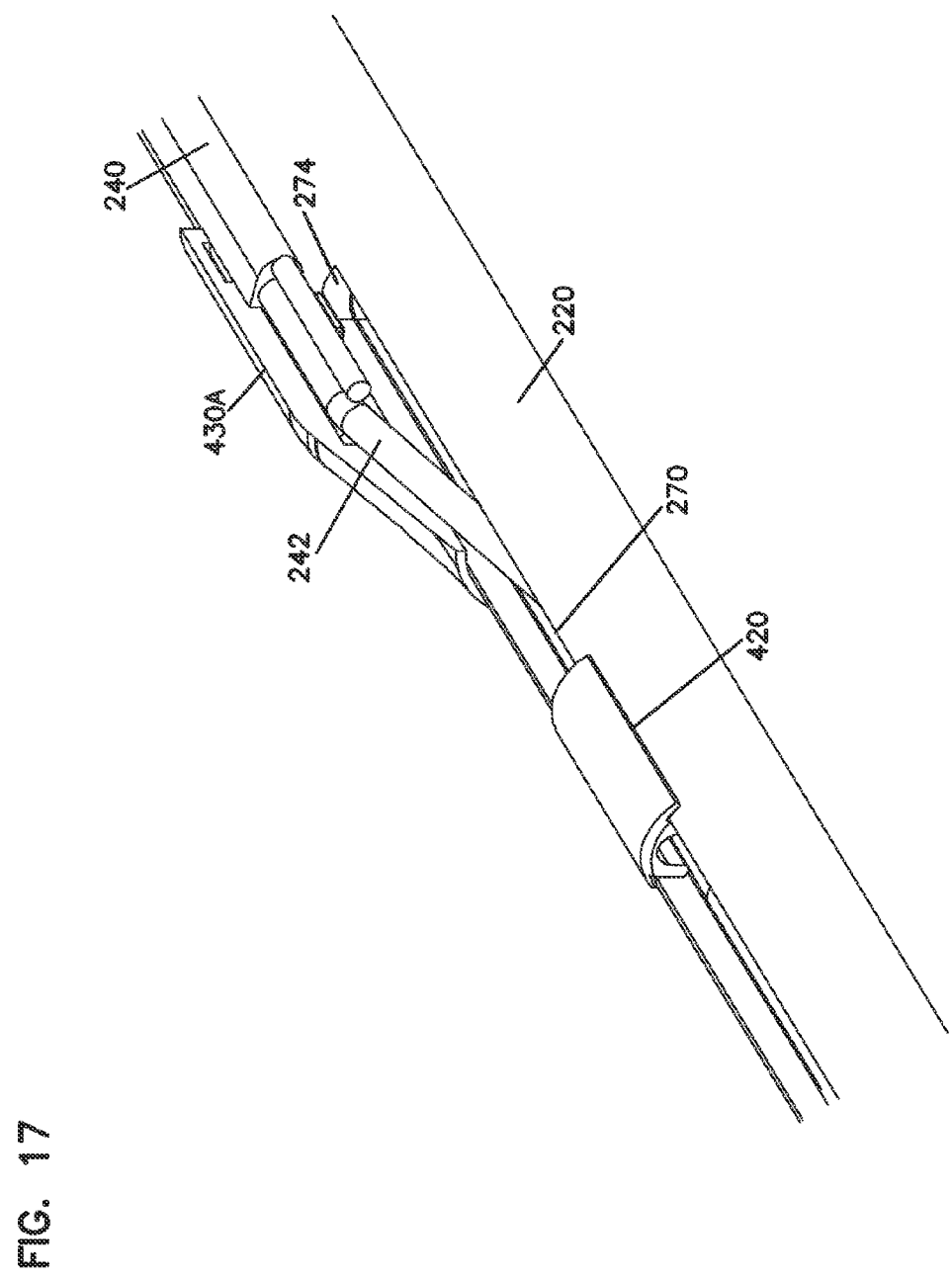
FIG. 17 is a partial, schematic view of the breakout assembly of FIG. 13 in which the tether is mounted to a first body member of the transition block and routed into the cut region of the distribution cable and in which the second body member of the transition block has been removed.
Figure 26:
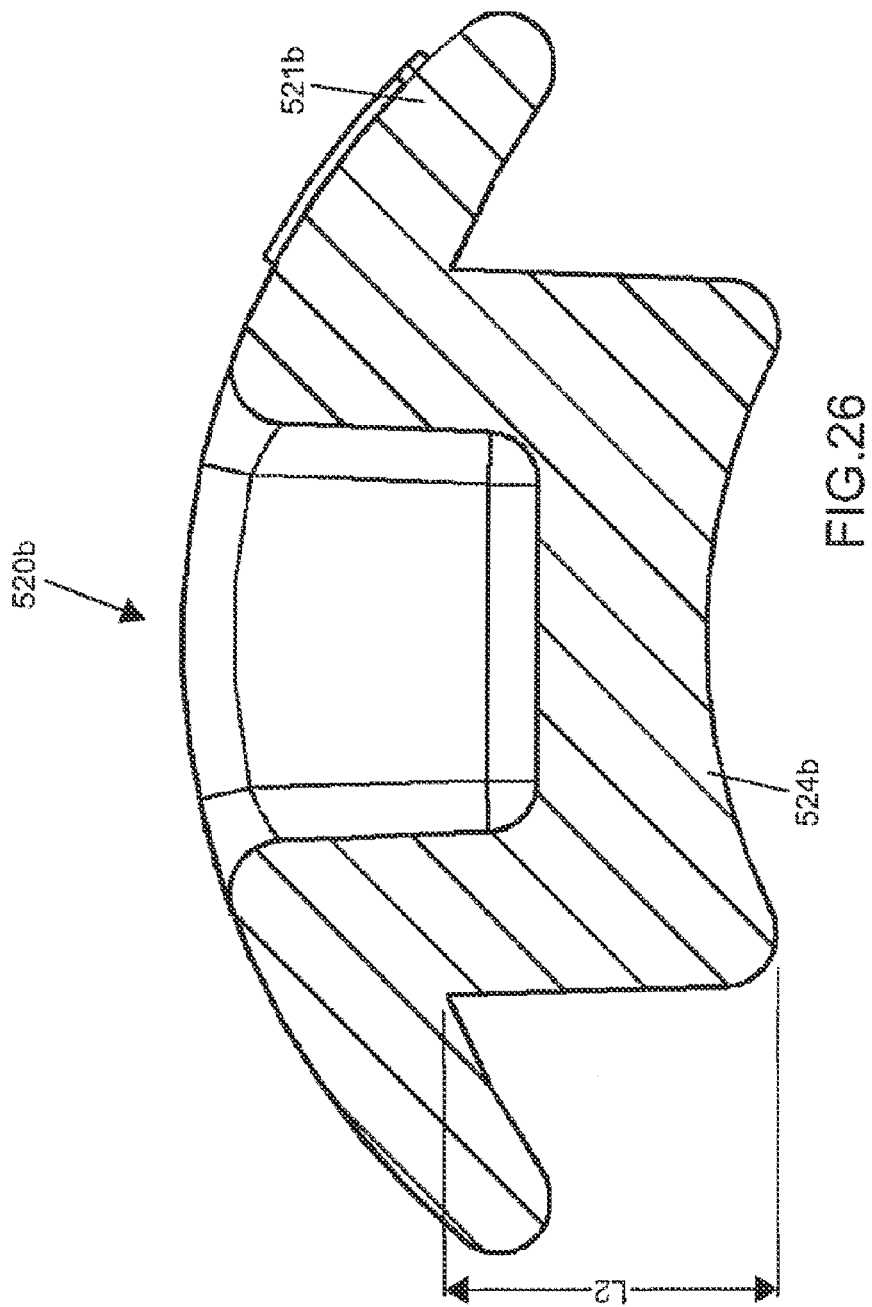
Figure 28:
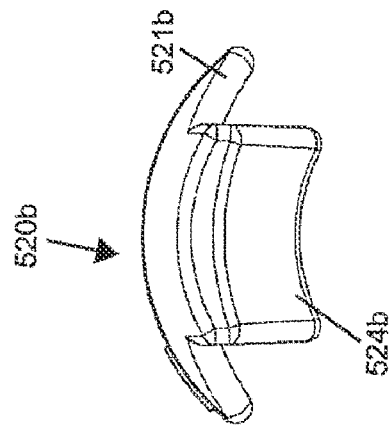
Figure 27:
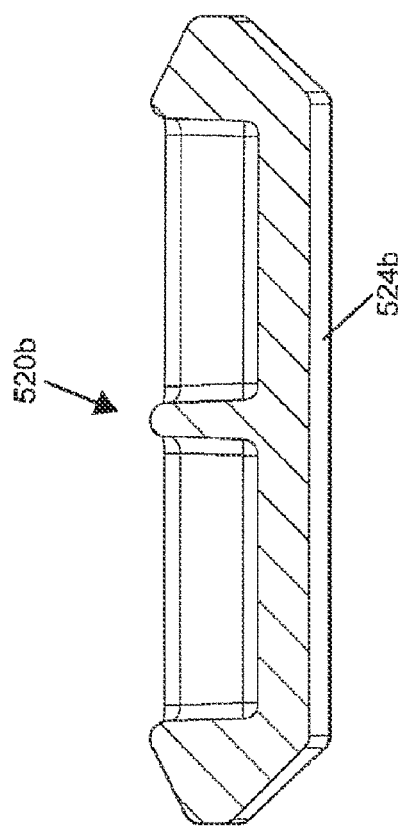

As shown in FIG. 17, the second channel 434 is configured to receive the tether 240 at the first end 431 and to route the tether 240 into the cut region 270 of the distribution cable 220. In a preferred embodiment, the second channel 434 is configured to receive the outer jacket 250 of the tether 240 at the first end 431 (see FIG. 17). In some embodiments, the strength members 246 of the tether 240 can be secured to the body member 430A adjacent the tapered portion of the second channel 434 (see FIG. 17). For example, the second channel 434 can include a pair of strength member receptacles 435 for receiving the strength members 246. The strength members 246 can be adhesively bonded within the receptacles 435. Further, a pocket 447 can be provided for receiving the mechanical crimp member 255 crimped to the tether to provide a further mechanical coupling between the tether 240 and the transition block 430. In other embodiments, however, the body member 430A can be configured to receive and hold the strength members 246 at any point along the second channel 434.

The transition block 430 also includes further structure for providing an effective mechanical interface with the tether 240. For example, the second channel 434 includes an end opening 459 sized to match the outer shape of the outer jacket 250 of the tether 240. Also, a buffer tube receptacle 449 for receiving the exposed buffer tube 242 of the prepared tether 240 is defined between the receptacles 435 that receive the exposed strength members 246 of the prepared tether 240.

The breakout assembly 400 can also include an over-mold 450 that encloses and seals the cut region 270 of the distribution cable 220 from the transition block 430 to adjacent the first end 272 of the cut region 270 (e.g., see FIG. 18). In certain embodiments, a wrap of heat resistant tape (e.g., silicone tape) can provide an intermediate layer between the distribution cable 220 and the over-mold 450.

The over-mold 450 is preferably made of a flexible polymer plastic material. It is preferred for the over-mold 450 to be sized with a cross sectional shape sufficient to allow the breakout location to be readily passed through a one and one-half inch inner diameter conduit or a one and one-quarter inch diameter conduit. In certain embodiments, the breakout location 260 has a cross sectional area that can be passed through a one inch inner diameter conduit.

Figure 36:
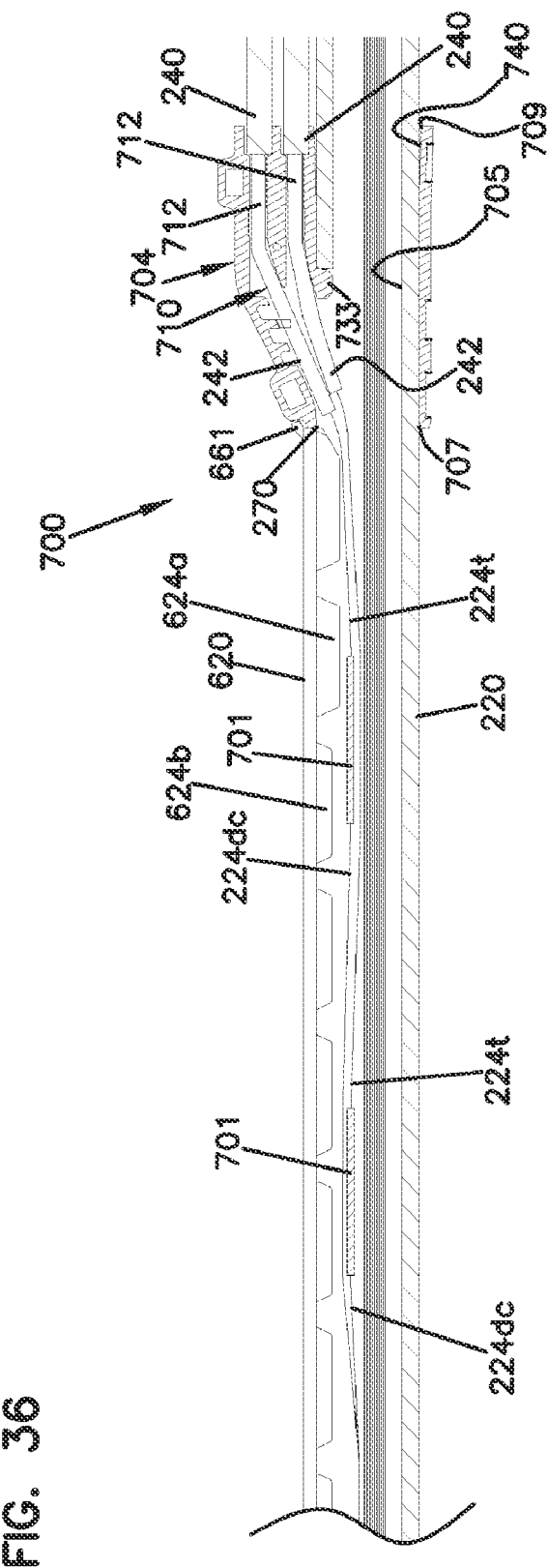
FIG. 36 shows another breakout assembly having features that are examples of inventive aspects in accordance with the principles of the present disclosure.
Figure 37:
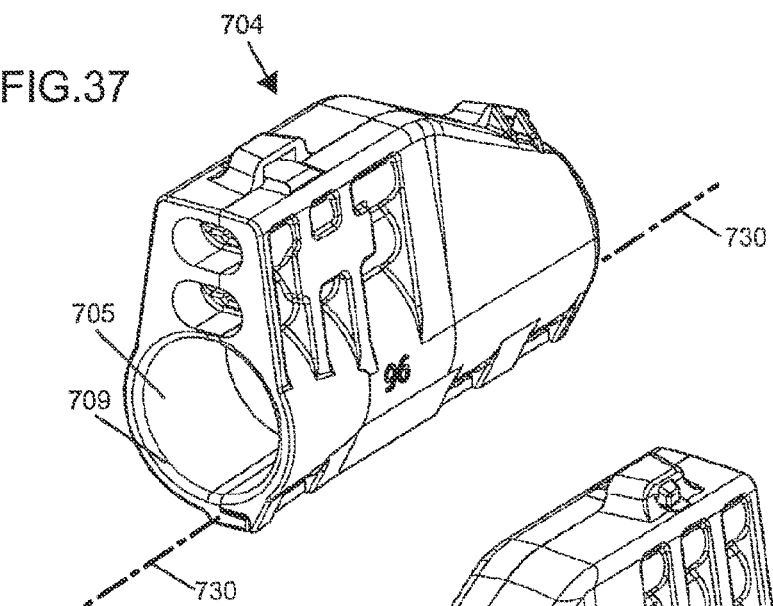
FIGS. 37-43 are various views of an anchor block of the breakout assembly of FIG. 36.
Figure 38:
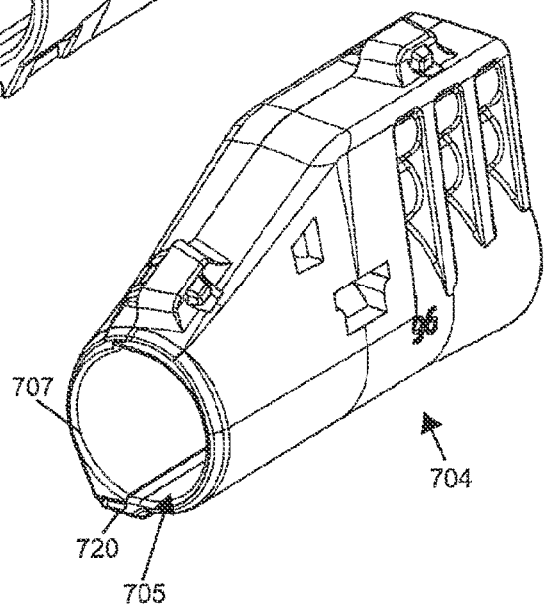
Figure 43:
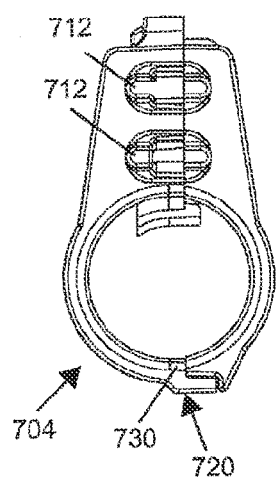
Figure 40:
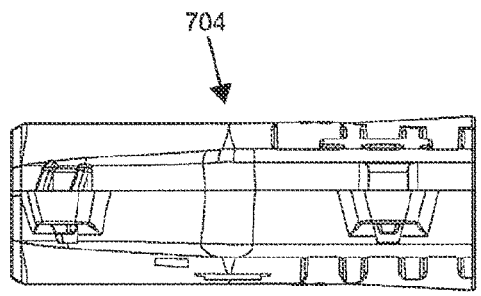
Figures 39, 42:
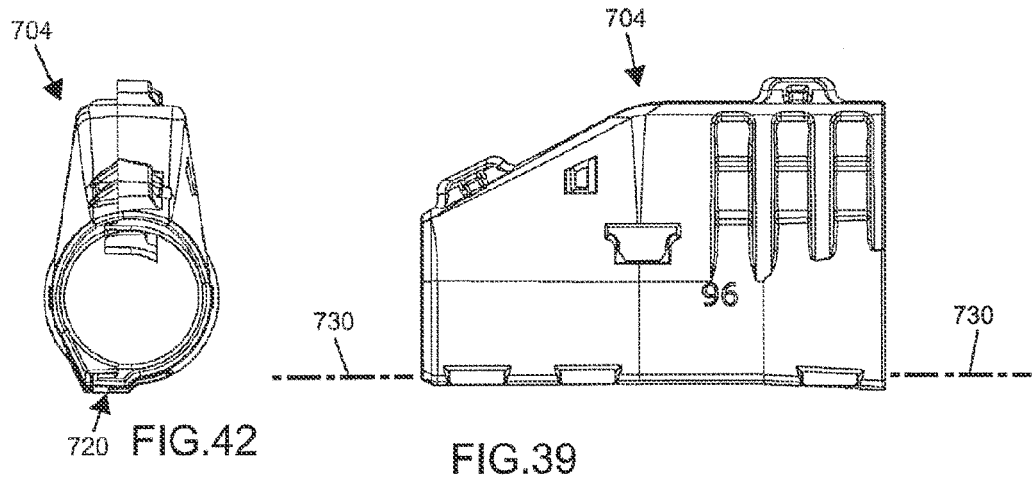
Figure 41:
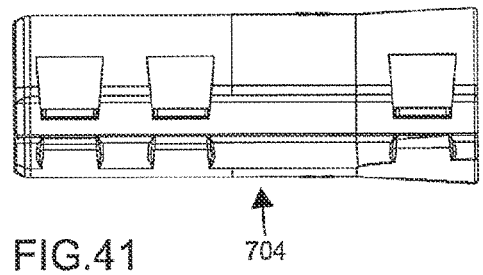
Figure 58:
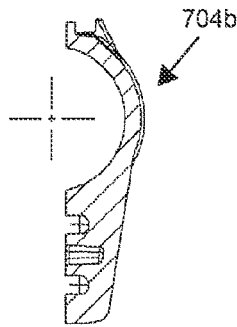
Figure 54:
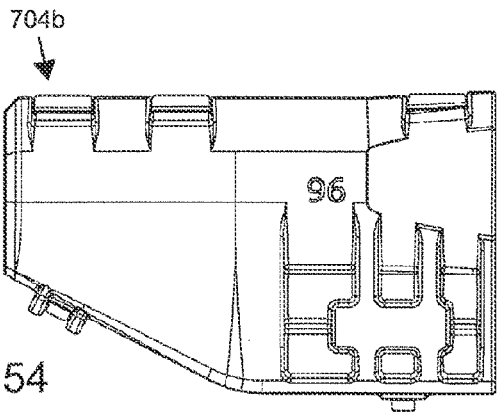
Figure 56:
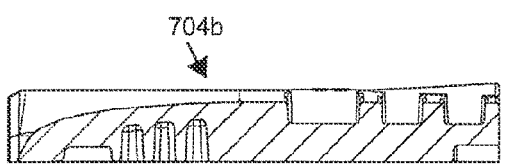
Figure 57:
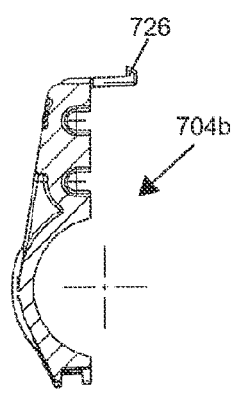
Figure 55:
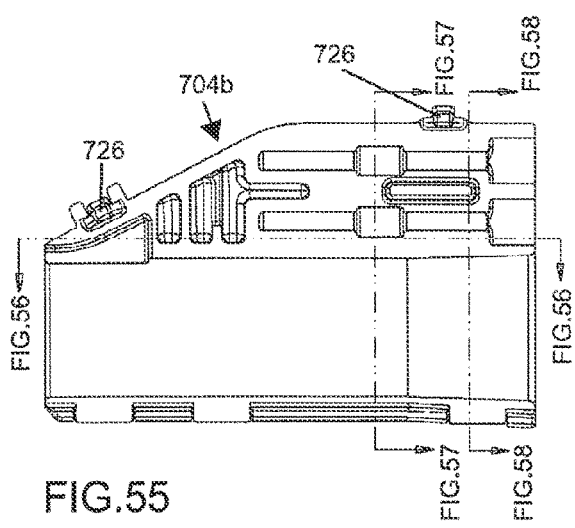
Figure 61:
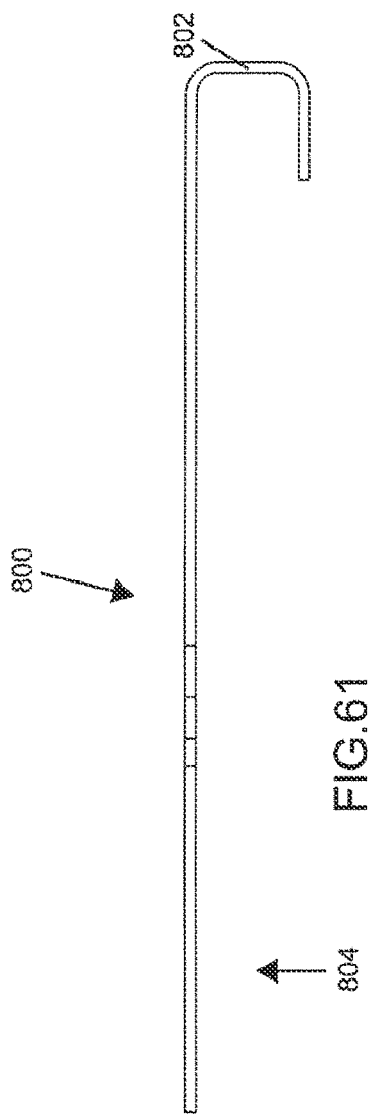
Figure 62:
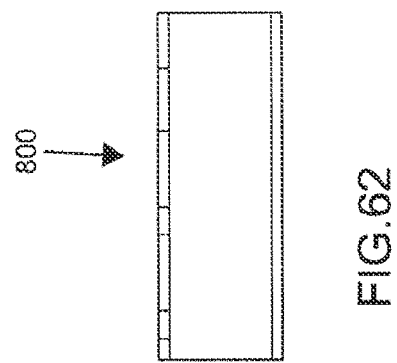

Referring now to FIG. 36, an alternative example of a breakout assembly 700 having features that are examples of inventive aspects in accordance with the principles of the present disclosure is shown. The breakout assembly 700 includes two splice protectors 701 (e.g., as described above) positioned over splices between the fibers $224_{dc}$, $224_t$. It will be appreciated that the fibers $224_{dc}$, $224_t$ depicted at FIG. 36 are each representative of a plurality of fibers (e.g., 12 fibers in the case of 12 fiber tethers). The breakout assembly 700 also includes the jacket support 620 of FIGS. 29-33, which is mounted in the cut region 270 of the breakout location. The splice protectors 701 are located within the jacket 230 of the distribution cable 220 at locations beneath the shorter legs 624b of the jacket support 620. The breakout assembly further includes a block 704 that functions to transition the fibers $224_t$ from the distribution cable 220 to the tethers 240, and also functions to anchor the tethers 240 to the distribution cable 220. The jacket support 620 includes a tab 661 that overlaps the block 704 to resist relative movement between the block 704 and the jacket support 620. In FIG. 36, overmold 450 is shown encasing the distribution cable breakout location.

Referring to FIGS. 39-43, the block 704 includes a cable channel 705 for receiving the distribution cable 220. The cable channel 705 is generally straight and extends from a first open end 707 to a second open end 709. The cable channel 705 receives the distribution cable 220 and allows the distribution cable 220 to pass through the block 704. It will be appreciated that the jacket 230 of the distribution cable 220 cab be adhesively bonded within the channel 705 such that the block 704 is mechanically anchored to the cable 220.

The block 704 also includes a tether channel arrangement 710 adapted for anchoring two tethers 240 to the block 704. The tether channel arrangement includes first and second tether channels 712 each adapted for receiving a tether 240. Similar to previous embodiments, the channels 712 can include structures for mechanically coupling the tethers to the block 704. For example, the tether channels 712 can include crimp pockets for receiving mechanical crimps coupled to the tethers, strength member receptacles for facilitating bonding the tether strength members to the block 704, and other structures.

The block 704 has a two piece configuration including pieces 704a, 704b that interconnect by a hinged, snap fit configuration. A hinge 720 is defined between the pieces 704a, 704b by tabs 722 of piece 704b that fit within openings 724 of piece 704a. A snap fit connection is provided between the pieces 704a, 704b by flexible cantilever latches 726 of piece 704b that fit within receivers 728 of piece 704a. To mount the block 704 on the distribution cable 220, the tabs 722 are inserted within the openings 724 and the cable 220 is inserted between the pieces 704a, 704b in alignment with the cable channel 705. The two pieces 704a, 704b are then pivoted toward one another about hinge line 730 thereby capturing the cable 220 within the cable channel 705. The pieces 704a, 704b are pivoted toward one another until the cantilever latches 726 snap within the receivers 728 thereby securing the pieces 704a, 704b together.

The block 704 includes other features for enhancing the breakout location. For example, piece 704a includes a lug 733 that fits within the cut region 270 to maintain rotational alignment between the distribution cable 220 and the block 704 during assembly (i.e., the lug prevents fits within the cut region 270 to prevent relative rotation from occurring between the block 704 and the distribution cable 220). Also, piece 704a includes an overlap member 735 that fits within a receptacle 737 of piece 704b to minimize any fiber pinch locations that may be present between the pieces 704a, 704b. Further, piece 704a includes an integral hook 739 for receiving the buffer tube 242 of one of the tethers 240 to retain the buffer tube 242 in close proximity to the piece 704a.

The cable channel 705 of the block 704 also includes a tapered diameter 740 adjacent the second open end 709. The tapered diameter 740 enlarges as the channel 705 extends toward the second open end 709. Prior to assembling the block 704 on the distribution cable 220, tape is wrapped about the cable at a location slightly offset from the end 274 of the cut region 270. By mounting the block 704 on the cable 220, and then sliding the block 704 axially along the cable toward the tape, the tape is received and compressed within the tapered diameter 740 to assist in sealing the second open end 709 of the cable channel 705.

Figure 64:
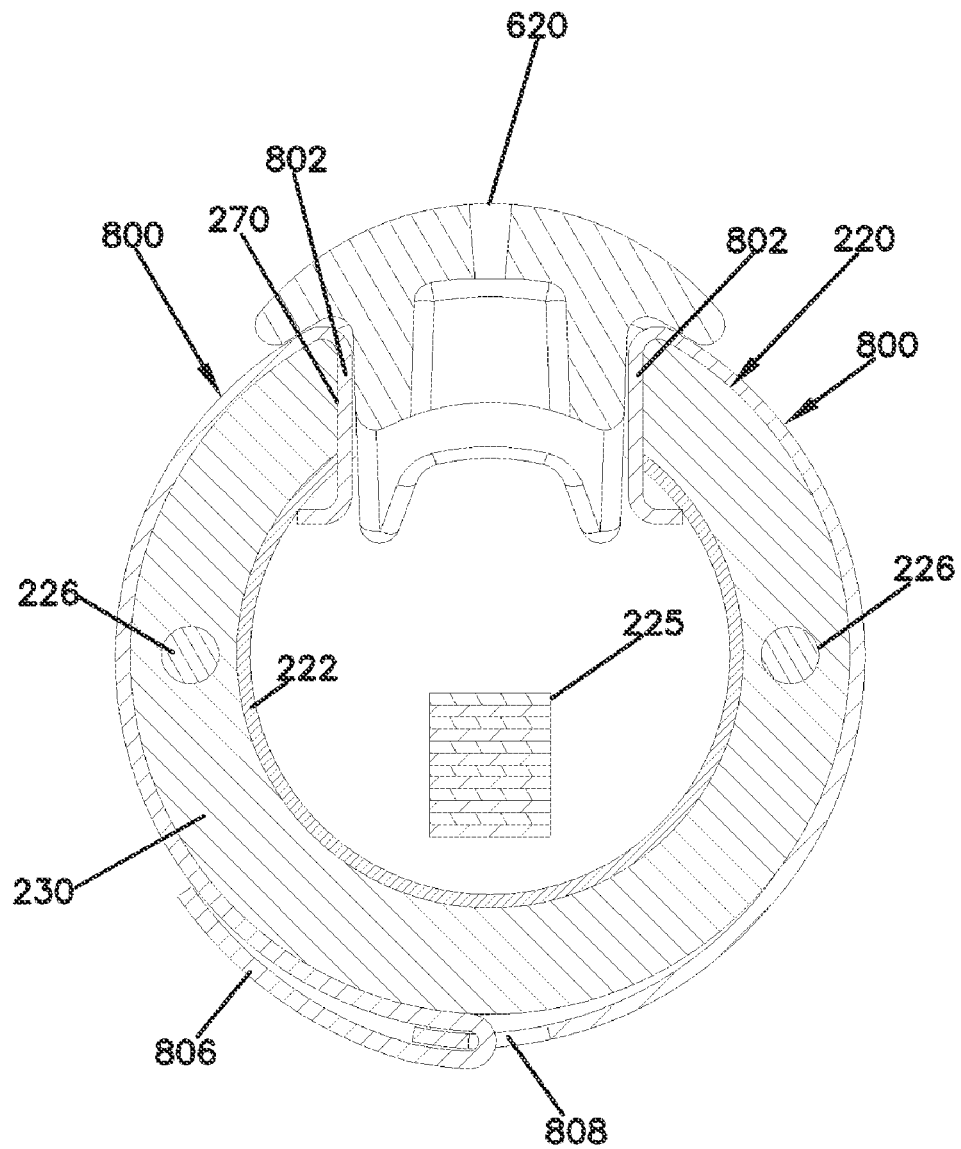
FIG. 64 is a cross-sectional view taken transversely through a distribution cable breakout location showing a pair of the reinforcing members of FIGS. 60-63 being used to reinforce the distribution cable.

In each of the above-described breakout arrangements, a cut region or slot was provided in the cable jacket 230 and buffer tube 222. Because the cable 220 has been compromised, flexing of the cable can cause distortion of the cable cross-section and/or movement of the strength member 226 within the cable 220. To protect the splice location, further reinforcement can be provided to resist cable distortion and/or strength member movement. FIGS. 60-63 show an example reinforcing member 800 that can be used to further reinforce the cable 220 at the cut region 270. The reinforcing member 800 is a bendable metal clip having a hook end 802 and a fastening end 804. The fastening end 804 includes a strap 806 and a strap receiver 808. In practice, a pair of the reinforcing members 800 are used together to reinforce the cable 220. As shown at FIG. 64, the hook ends 802 are inserted through the cut region 270 and hooked over the cut edges of the jacket 230 and the buffer tube 222. The bodies of the reinforcing members 800 are bent around the outer diameter of the jacket 230 and fastening ends 804 are fastened together at the side of the cable 220 opposite form the cut region 270. The members 800 are fastened together by inserting the straps 806 through the receivers 808, and bending the straps 806 while pulling the straps tight. It will be appreciated that one or more of the pairs of reinforcing members 800 can be used to reinforce the cable 220 at the cut region 270. In one embodiment, a plurality (e.g., 6 or more) of the pairs of reinforcing members 800 are uniformly spaced along the length of the cable 220 that coincides with the cut region 270.

Figure 68:
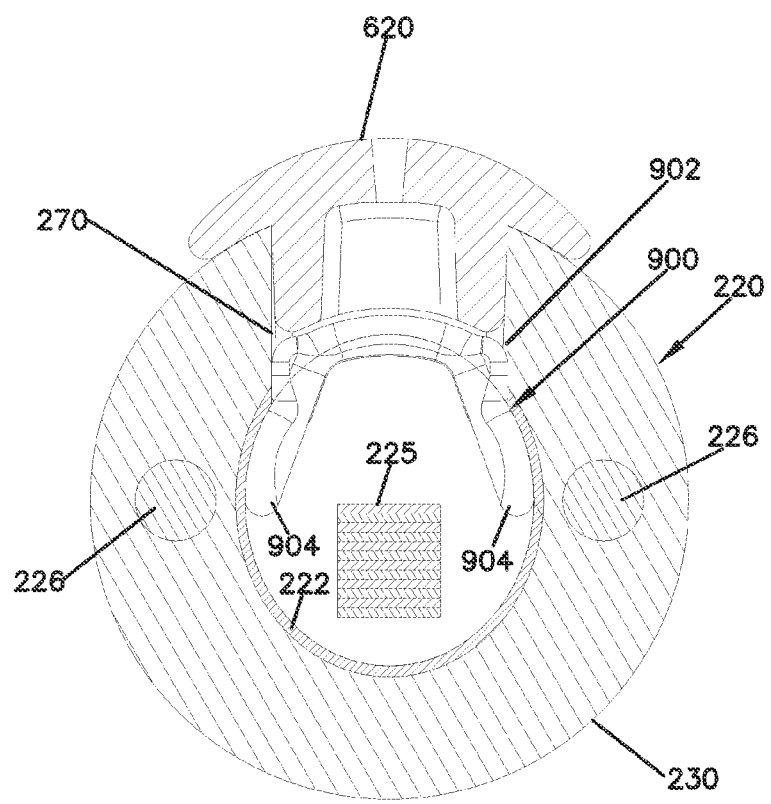
FIG. 68 is a cross-sectional view taken transversely through a distribution cable breakout location showing the reinforcing member of FIGS. 65-67 being used to reinforce the distribution cable.

FIGS. 65-68 show another reinforcing member 900 that can be used to further reinforce the cable 220 at the cut region 270. The reinforcing member 900 is a buffer tube spreader that fits within the buffer tube 222 as shown at FIG. 68 to assist in holding the buffer tube open. The reinforcing member 900 includes an insert portion 902 that fits within the cut region 270, and spreader wings 904 that angle outwardly from the insert portion 902. It will be appreciated that one or more of the reinforcing members 900 can be used to reinforce cable 220 at the cut region 270. In one embodiment, a plurality (e.g., 6 or more) of the reinforcing members 900 are uniformly spaced along the length of the cable 220 that coincides with the cut region 270. For certain applications, the reinforcing members 800 and 900 can be used separately or in combination with one another to reinforce a distribution cable.

Figure 73:
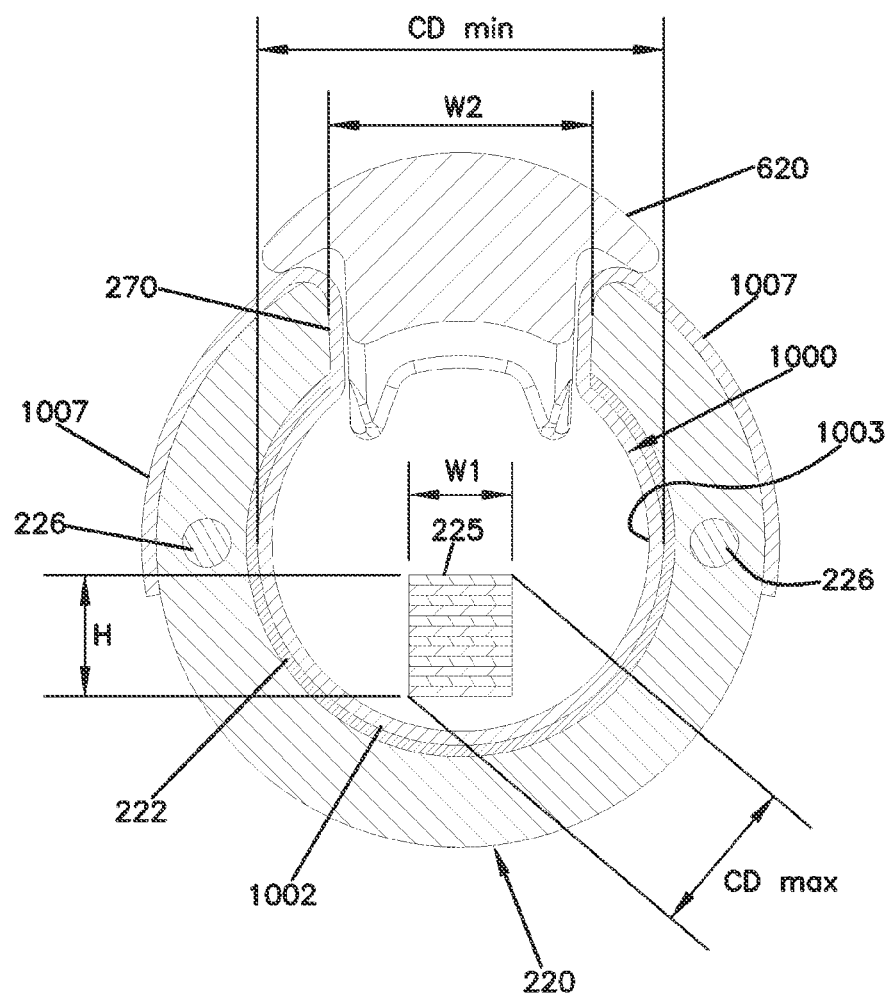
FIG. 73 is a cross-sectional view taken transversely through a distribution cable breakout location showing the reinforcing member of FIGS. 69-72 being used to reinforce the distribution cable.
Figure 74:
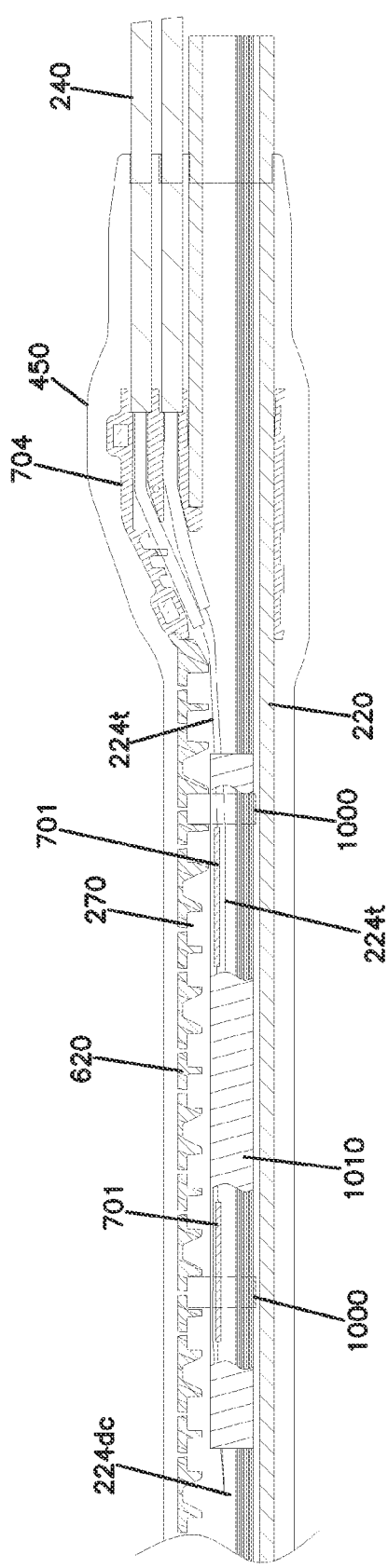
FIG. 74 is a cross-sectional view taken transversely through a distribution cable breakout location showing a plurality of the reinforcing members of FIGS. 69-72 spaced apart along the length of the breakout location so as to provide multiple reinforcement locations along the length of the breakout location.
Figure 75:
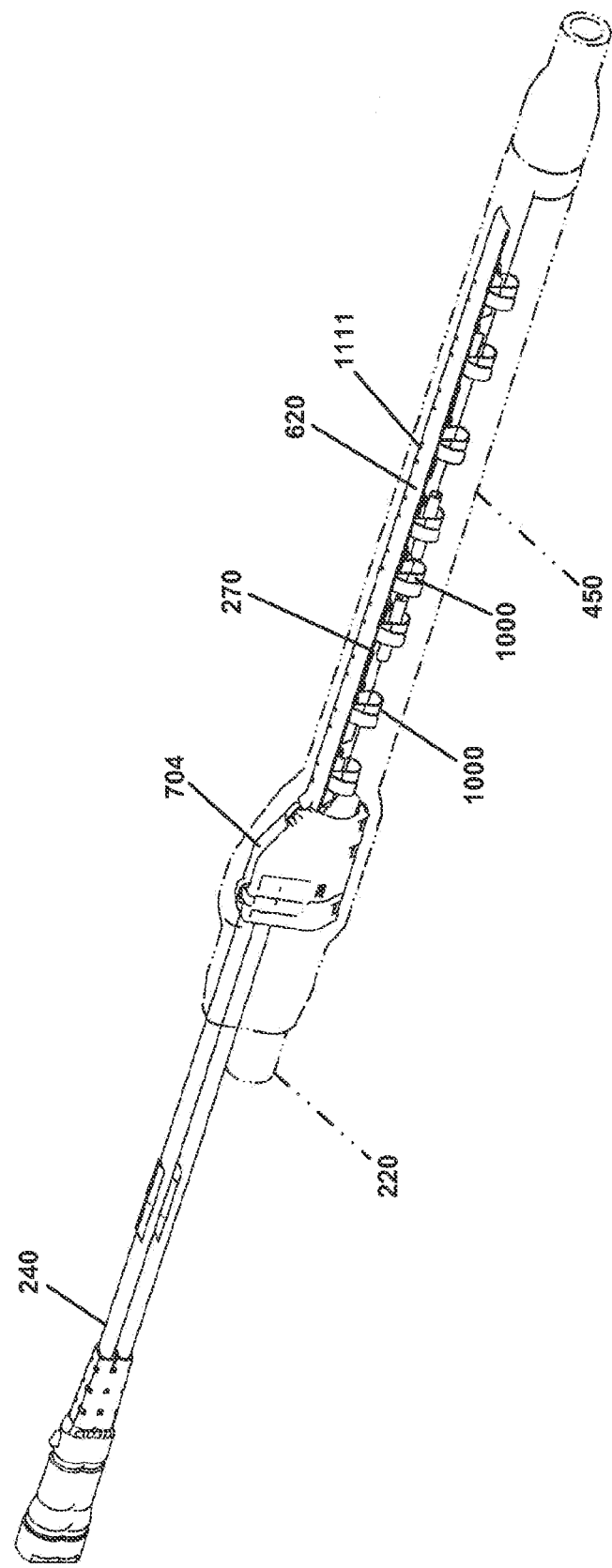
FIG. 75 is a perspective view of the distribution cable breakout location of FIG. 74.

FIGS. 69-73 show another reinforcing member 1000 that can be used to further reinforce the cable 220 at the cut region 270. The reinforcing member 1000 is a clip that fits within the buffer tube 222, as shown at FIG. 73, to assist in holding the buffer tube open. The reinforcing member 1000 can be made of a metal, plastic or other materials suitable for reinforcing the buffer tube 222. The reinforcing member 1000 includes a central portion 1002 defining a channel 1003 that extends through the reinforcing member 1000 and that defines a pass-through axis 1011. From an end view as shown at FIG. 70, the channel having an open side 1004 and a closed side 1005. When the reinforcing member 1000 is installed within the cable 220 as shown at FIG. 73, the central portion 1002 fits within the buffer tube 222 with the closed side 1005 positioned adjacent a bottom side of the buffer tube 222 and the open side 1004 positioned at the cut region 270. Also, the pass-through axis 1011 of the channel 1003 is generally parallel to a central axis 1009 of the buffer tube 222, and the ribbon stack 225 of the cable 220 passes through the channel 1003. Reinforcing arms 1007 project outwardly from the central portion 1002. The reinforcing arms 1007 have a curvature 1008 that generally matches an outer diameter of the cable jacket 230. When the reinforcing member 1000 is mounted to the cable 220 at a breakout location, as shown at FIG. 73, the arms 1007 extend around at least a portion of the outer diameter of the cable jacket 230 and assist in preventing the cut region 270 from collapsing. It will be appreciated that one or more of the reinforcing members 1000 can be used to reinforce cable 220 at the cut region 270. In the embodiment of FIG. 74, a plurality (e.g., 6 or more) of the reinforcing members 1000 are uniformly spaced along the length of the cable 220 that coincides with the cut region 270. In this way, the breakout location includes segmented reinforcement with areas of reinforcement axially separated by areas of flexibility 1111. In FIG. 75, overmold 450 is shown enclosing the breakout location.

At a given breakout location, it has been determined that fibers $224_{dc}$ accessed from the ribbon stack 225 as well as the tether fibers $224_t$ spliced to the fibers $224_{dc}$ can become pinched or otherwise damaged at the cut region 270. To prevent this from occurring, the fibers $224_{dc}$, $224_t$ can be secured/bundled to the ribbon stack 225 to assist in keeping the fibers $224_{dc}$, $224_t$ within the interior of the buffer tube 222 for most of the length of the cut region 270. As shown at FIG. 74, a securing member 1010 (e.g., a spiral wrap, a tape, a film or other structure) is used to secure the fibers $224_{dc}$, $224_t$ to the ribbon stack 225 along the length of the cut region 270 up to the point where the fibers $224_t$ are routed from the interior of the buffer tube 222 to the block 704.

Various breakout configurations in accordance with the principles of the present disclosure are adapted to allow any of the fibers of the ribbon stack 225 to be accessed for splicing to a tether fiber $224_t$ regardless of whether the ribbon fiber desired to be accessed is at the top, bottom or middle of the ribbon stack 225. Referring to FIG. 73, the ribbon stack 225 has a width W1, a height H and a maximum cross-dimension CDmax. To facilitate accession any of the fibers of the ribbon stack, the cut region 270 is provided with a width W2 that is larger than the width W1. It is preferred for the width W2 to be greater than the width W1 along the entire length of the cut region 270 (e.g., see the embodiment of FIG. 4). By sizing the width W2 larger than the width W1, the ribbon stack 25 can be manually pulled through the cut region 270 to facilitate accessing any fiber of the ribbon stack desired to be accessed. Referring again to FIG. 73, the minimum cross-dimension CDmin defined by the channel of the buffer tube 222 is preferably greater than the maximum cross-dimension CDmax defined by the ribbon stack 225 to allow the ribbon stack 225 to be manually twisted/rotated about its central axis within the buffer tube 222 when the fibers $224_{dc}$ are being accessed. This allows the ribbon stack 225 to be manually twisted within the buffer tube 222 to facilitate pulling the ribbon stack 225 through the cut region 270 and to facilitate accessing any of the fibers of the ribbon stack regardless of whether they are on the top (i.e., facing toward the cut region), bottom (i.e., facing away from the cut region) or middle of the ribbon stack. In the embodiment of FIG. 73, the buffer tube 222 has a circular transverse cross-section with the minimum cross dimension CDmin being defined by the inner diameter of the buffer tube 222.

As used herein, when the fibers $224_{dc}$, $224_t$ have been spliced together, the fibers $224_{dc}$, $224_t$ can collectively be referred to as an optical fiber structure. In such a case, the optical fiber structure includes a first length of optical fiber within the distribution cable, a second length of optical fiber that extends through the breakout location and a third length of optical fiber that extends through the tether. The first, second and third lengths are in optical communication with one another so as to define a signal path that extends from the distribution cable, through the breakout location, to the end of the tether. The term optical fiber structure also includes lengths of optical fibers that do not include intermediate splices (e.g., a spliceless breakout). As used herein, the term "breakout portions" of optical fiber include portions of optical fiber that extend along the length of a breakout location. Breakouts in accordance with the present disclosure can be enclosed/sealed for outside environmental use. For example, sealing structures such as overmolds, heat-shrink tubes, heat-shrink tape/wrap or other sealing structures can be used.

The above specification provides examples of how certain inventive aspects may be put into practice. It will be appreciated that the inventive aspects can be practiced in other ways than those specifically shown and described herein without departing from the spirit and scope of the inventive aspects.

We claim:

1. A telecommunications cable comprising:
   a main cable including a cable jacket and a central buffer tube positioned within the cable jacket, the central buffer tube defining a buffer tube passage, the main cable also including a ribbon stack positioned within the buffer tube passage, the ribbon stack including a width, a height and a maximum cross-dimension, the buffer tube passage having a minimum cross-dimension, the main cable including a cut region where a slot has been cut through the cable jacket and the central buffer tube to provide access to the ribbon stack during manufacture of the telecommunications cable, the slot having a length and a width, the width of the slot being larger than the width of the ribbon stack, the minimum cross-dimension of the buffer tube passage being larger than the maximum cross-dimension of the ribbon stack, and a portion of the cable jacket extending continuously across the cut region along the length of the slot;

a tether that branches from the main cable at the cut region;

an optical fiber structure that extends from the ribbon stack, through the cut region and into the tether; and an enclosure covering the cut region.

2. The telecommunications cable of claim 1, wherein the buffer tube passage is circular, and wherein the minimum cross-dimension of the buffer tube passage equals an inner diameter of the central buffer tube.

3. The telecommunications cable of claim 1, wherein the slot that has been cut through the cable jacket is rectangular.

4. A telecommunications cable comprising:

a main cable including a cable jacket and a central buffer tube positioned within the cable jacket, the central buffer tube defining a buffer tube passage, the main cable also including a ribbon stack positioned within the buffer tube passage, the main cable including a cut region where a slot has been cut through the cable jacket and the central buffer tube to provide access to the ribbon stack during manufacture of the telecommunications cable, the ribbon stack including at least an accessed optical fiber that is accessed at the cut region, and a portion of the cable jacket extending continuously across the cut region along a length of the slot;

a tether that branches from the main cable at the cut region, the tether including a tether buffer tube surrounding at least a first optical fiber of the tether, the first optical fiber of the tether being optically coupled to the accessed optical fiber of the ribbon stack at a coupling location located inside an outer boundary defined by the cable jacket; and a securing structure that binds the accessed optical fiber and the first optical fiber of the tether to the ribbon stack within the buffer tube passage.

5. The telecommunications cable of claim 4, wherein the securing structure includes a film that wraps around the accessed optical fiber and the first optical fiber and that prevents the accessed optic fiber and portions of the first optical fiber of the tether from moving outside the central buffer tube and into the cut region.

6. The telecommunications cable of claim 4, wherein the slot that has been cut through the cable jacket is rectangular.

7. A telecommunications cable comprising:

a main cable including a cable jacket and a central buffer tube positioned within the cable jacket, the central buffer tube defining a buffer tube passage, the main cable also including a ribbon stack positioned within the buffer tube passage, the main cable including a cut region where a slot has been cut through the cable jacket and the central buffer tube to provide access to the ribbon stack during manufacture of the telecommunications cable, the ribbon stack including at least an accessed optical fiber that is accessed at the cut region;

a tether that branches from the main cable at the cut region; and a reinforcing member for reinforcing the main cable at the cut region, the reinforcing member including a central portion positioned within the buffer tube passage, the central portion defining a channel through which the ribbon stack is routed, the reinforcing member also including arms that project outwardly from the central portion and extend around at least a portion of an exterior of the cable jacket.

8. The telecommunications cable of claim 7, wherein the main cable is reinforced by a plurality of the reinforcing members that are spaced apart along a length of the main cable coinciding with the cut region.

9. The telecommunications cable of claim 8, further comprising an elongate jacket support that covers the slot in the cable jacket and includes legs that fit inside the channels defined by the central portions of the reinforcing members.

10. The telecommunications cable of claim 9, wherein the tether includes a tether fiber that is spliced to the accessed optical fiber of the ribbon stack at a location beneath the elongate jacket support.

11. The telecommunications cable of claim 10, further comprising a block mounted to the main cable at one end of the cut region, the tether being anchored to the block and the block functioning to transition the tether fiber from the tether to the cut region.

* * * * *